US011073821B2

(12) United States Patent
Lee et al.

(10) Patent No.: US 11,073,821 B2
(45) Date of Patent: Jul. 27, 2021

(54) APPARATUS AND METHOD FOR TRACKING A MATERIAL THROUGH A PLURALITY OF PROCESSES AND FACILITIES

(71) Applicant: Samsung Electronics Co., Ltd., Suwon-si (KR)

(72) Inventors: Minho Lee, Suwon-si (KR); Youngwoong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/248,334

(22) Filed: Jan. 15, 2019

(65) Prior Publication Data

US 2020/0081419 A1 Mar. 12, 2020

(30) Foreign Application Priority Data

Sep. 12, 2018 (KR) ........................ 10-2018-0109010

(51) Int. Cl.
  *G05B 19/418* (2006.01)
  *G06T 7/00* (2017.01)
  (Continued)

(52) U.S. Cl.
  CPC ..... *G05B 19/4183* (2013.01); *G06F 16/2379* (2019.01); *G06T 7/0004* (2013.01); *G05B 2219/49302* (2013.01); *G06T 7/20* (2013.01)

(58) Field of Classification Search
  CPC ..... G06F 16/2379; G06T 7/0004; G06T 7/20; G05B 2219/49302
  See application file for complete search history.

(56) References Cited

U.S. PATENT DOCUMENTS 7,242,306 B2 7/2007 Wildman et al.
7,571,178 B2 8/2009 Watanabe et al.
(Continued)

FOREIGN PATENT DOCUMENTS

EP 1 391 796 A1 2/2004
EP 3 208 757 A1 8/2017
(Continued)

OTHER PUBLICATIONS

Furukawa Koichiro, English translation of WO2015174115A1, retrieved from Espacenet (Year: 2015).*
(Continued)

*Primary Examiner* — Kenneth M Lo
*Assistant Examiner* — Istiaque Ahmed
(74) *Attorney, Agent, or Firm* — Jefferson IP Law, LLP

(57) ABSTRACT

A server and a controlling method therefor are provided. The server includes a communicator, a memory, and a processor configured to receive first log information related to a first material generated in a first facility among facilities, the first facility belonging to a first process for manufacturing a product through the communicator, generate an identifier (ID) regarding the first material, generate tracking information on the first material based on the first log information, assign the ID to the tracking information, receive pieces of second log information generated in a second facility among the facilities, the second facility belonging to a second process following the first process through the communicator, identify second log information corresponding to the first material among the pieces of second log information based on the first log information included in the tracking information, and update the tracking information based on the identified second log information.

12 Claims, 21 Drawing Sheets

(51) Int. Cl.
   *G06F 16/23* (2019.01)
   *G06T 7/20* (2017.01)

(56) References Cited

U.S. PATENT DOCUMENTS

| | | |
|---|---|---|
| 8,924,548 B2 | 12/2014 | Frost et al. |
| 2004/0139101 A1* | 7/2004 | Watanabe .......... G05B 19/4183 |
| 2014/0207774 A1 | 7/2014 | Walter et al. |
| 2015/0278721 A1* | 10/2015 | Oku .................... G06F 16/2291 |
| | | 705/7.11 |
| 2015/0347801 A1* | 12/2015 | Svetal .................. G06K 7/1447 |
| | | 235/454 |
| 2017/0200034 A1 | 7/2017 | Sawyer |
| 2017/0230424 A1 | 8/2017 | Molloy et al. |
| 2017/0286904 A1 | 10/2017 | Paris, Jr. et al. |
| 2018/0059651 A1 | 3/2018 | Oku |
| 2018/0096180 A1 | 4/2018 | Hochhalter et al. |
| 2018/0136633 A1 | 5/2018 | Small et al. |
| 2018/0191988 A1* | 7/2018 | Takahashi .......... H04N 5/44591 |
| 2018/0196409 A1 | 7/2018 | Ben-Bassat et al. |
| 2018/0356804 A1* | 12/2018 | Oka ................. G06Q 10/06315 |
| 2019/0112134 A1* | 4/2019 | Ooba ..................... B25J 9/1687 |
| 2019/0130596 A1* | 5/2019 | Manafighazani ......... G06T 7/70 |

FOREIGN PATENT DOCUMENTS

| | | |
|---|---|---|
| JP | 3313844 B2 | 8/2002 |
| JP | 2005-141353 A | 6/2005 |
| JP | 2006-155511 A | 6/2006 |
| JP | 2007-079918 A | 3/2007 |
| JP | 5665561 B2 | 2/2015 |
| WO | 2015/174115 A1 | 11/2015 |
| WO | WO-2015174115 A1 * | 11/2015 ........... G05B 19/418 |

OTHER PUBLICATIONS

Search Report and Written Opinion dated Jun. 4, 2019, issued in International Application No. PCT/KR2019/001467.
European Search Report dated May 27, 2021; European Appln No. 19861130.3-1205/3776130 PCT/KR2019001467.

* cited by examiner

FIG. 7B

TRACKING INFORMATION OF ID0031

*BEFORE STARTING PROCESS, ID OF PROCESSED PRODUCT IN TS001/T001 IS SET AS 0031

| TIME | Log | | | | Asset Tracking |
|---|---|---|---|---|---|
| When | Who | Action | What | where | INTERPRETATION | Asset Tracking |
| 2018-06-17 T13:45:30 | a001 | put | ts001 | b020 | AGV MOVES TRAYSET TO BUFFER | 0031 IS LOCATED ON B020 |
| ... | | | | | | |
| 2018-06-17 T13:47:28 | r025 | load | ts001 | Inputtrayset | ROBOT STACKS TRAYSET ON LOCATION OF IT'S OWN INPUT TRAY | 0031 IS LOCATED ON INPUTTRAYSET OF R025 |
| 2018-06-17 T13:47:30 | r025 | set | t001 | Inputtray | ROBOT SETS LOCATION OF INPUT TRAY | 0031 IS LOCATED ON TL0 OF R025-TS001-T001 |
| 2018-06-17 T13:48:00 | r025 | load | TL0 | L2 | ROBOT PUTS PROCESSED PRODUCT WHICH IS ON TL0 OF TRAY IN L2 CNC | 0031 IS LOCATED ON C458 |
| 2018-06-17 T13:48:10 | c458 | Start | | | L2 CNC STARTS PROCESSING | |
| 2018-06-17 T13:52:45 | r025 | set | ts003 | outputtrayset | ROBOT SETS OUTPUT TRAYSET | |
| 2018-06-17 T14:02:01 | r025 | set | t008 | outputtray | ROBOT SETS LOCATION OF OUTPUT TRAYSET | |
| 2018-06-17 T14:08:03 | c458 | Complete | | | L2 CNC FINISHES PROCESSING | |
| 2018-06-17 T14:10:21 | r025 | unload | L2 | TL7 | ROBOT PUTS OUT OF L2CNC AND STACKS ON TL7 | 0031 IS LOCATED ON TL7 OF R025-TS003-T008 |

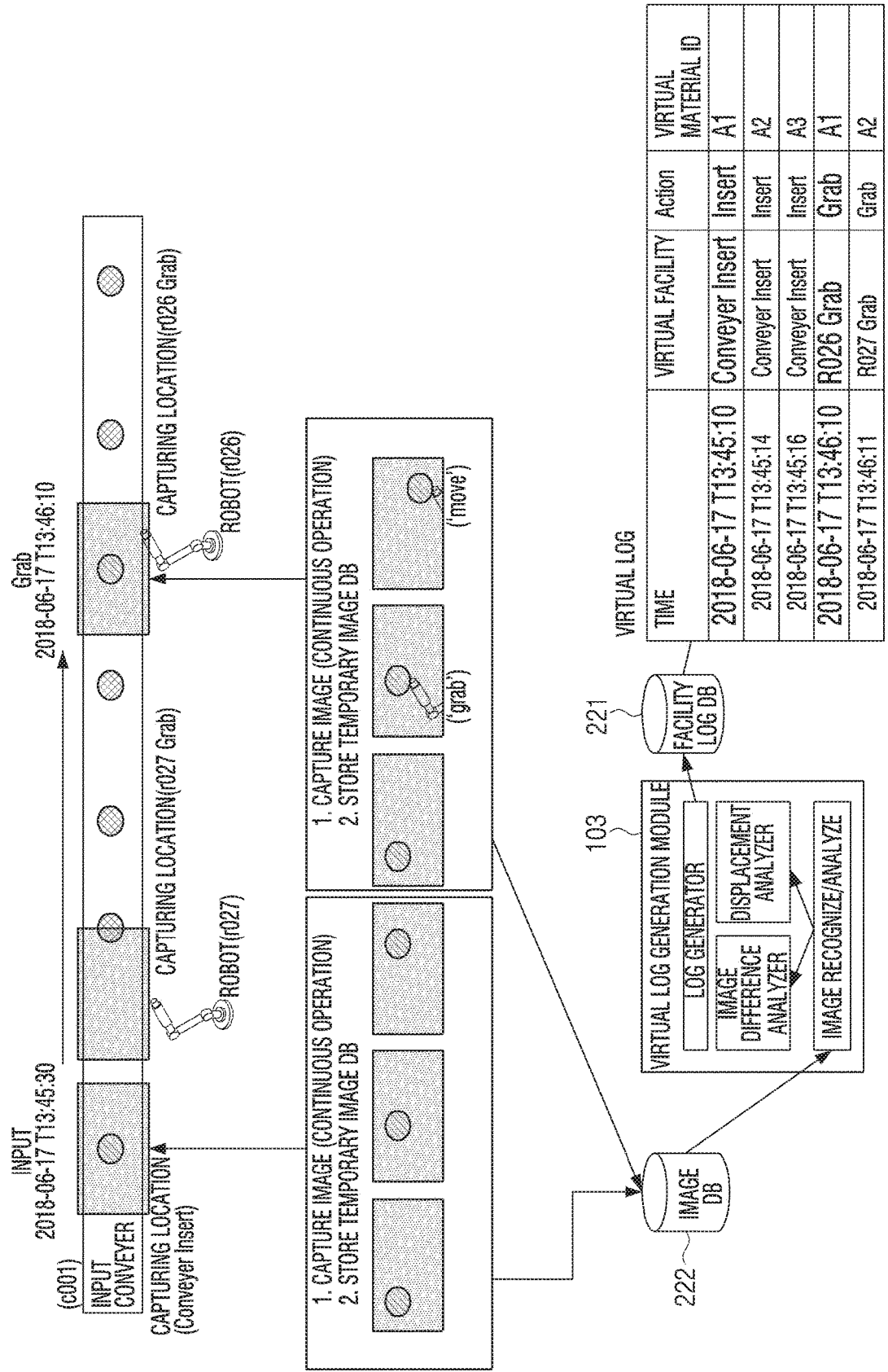

FIG. 10

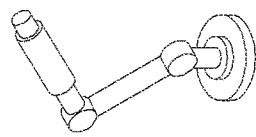
AGV MOVES TRAYSET

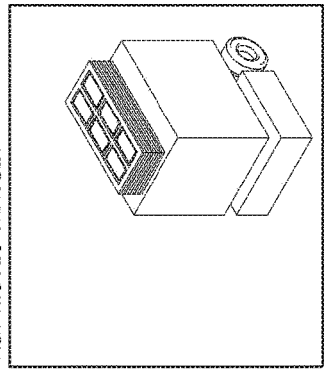
ROBOT SETTLES SAMPLE OF ID0031 ON LEFT UPPER PORTION OF TRAY CT2018003 → GENERATE LOG WHEN ROBOT COMPOSES TRAYSET, TRAY CT2018003 IS SETTLED ON LOCATION OF T001 → GENERATE LOG

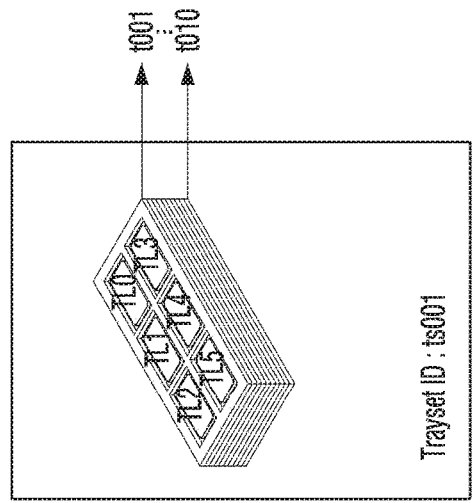

ROBOT CAN REMAIN LOG REGARDING
- IN WHAT ORDER TRAY IS (T001~T010)
- IN WHICH LOCATION OF TRAY SAMPLE IS (TL0~TL5)
→ GENERATE LOG

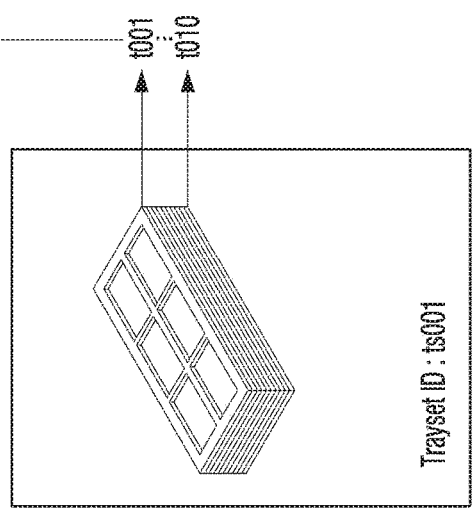
Trayset ID : ts001

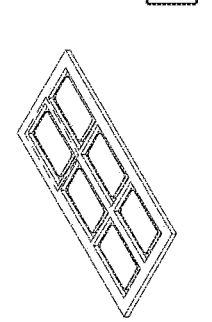
Trayset ID : ts001

STRUCTURE OF STACK TRAY: 10 TRAYS ON TRAYSET
TRAYSET IS UNIT MOVED BY AGV (= LOT)
TRAYSET ID (TS0011) IS NEWLY GENERATED WHENEVER TRAYSET IS COMPOSED (BASED ON GENERATION TIME) → GENERATE LOG

APPARATUS AND METHOD FOR TRACKING A MATERIAL THROUGH A PLURALITY OF PROCESSES AND FACILITIES

CROSS-REFERENCE TO RELATED APPLICATION(S)

This application is based on and claims priority under 35 U.S.C. § 119 of a Korean patent application Number 10-2018-0109010, filed on Sep. 12, 2018, in the Korean Intellectual Property Office, the disclosure of which is incorporated by reference herein in its entirety.

BACKGROUND

1. Field

The disclosure relates to a server and a controlling method thereof. More particularly, the disclosure relates to a server which can consistently track a location of a material related to a facility based on log information obtained from different facilities that perform related operations and by using the correlation thereof, and a controlling method thereof.

2. Description of Related Art

Development of a wireless communication technology and internet of things realizes an integrated control management system which was called ubiquitous in the past to be more intelligent and convenient.

Many facilities are installed in a large factory (or, referred to as a plant) for manufacturing products. For reliability of a manufactured product and a maintenance of the facility itself, when a defective product occurs, the process for understanding the cause of the defective product is required.

If production processes are successive, it is impossible to perform inspection in every process. Accordingly, the inspection has been conducted only in a main point and a final inspection has been conducted, but even if products pass the final inspection, many defective products are reported by consumers.

However, there is a large gap between the time point of manufacture and the time point when consumers report the defective products, and there are a number of production processes related to one defect in the successive production processes and also, there are a number of factors that affect the defect in one production process, and thus, it is difficult to identify the cause of the defect.

Meanwhile, in the case of an assembly process, the process time for each facility is short (e.g., within seconds) and uniform, and thus, the process can be performed as an in-line operation, and accordingly, there is no big difficulty in tracking the facility where a product went through. However, in the case of a component process, the process time for each facility is long (e.g., within minutes) and performed in parallel and thus, the component process cannot be performed as an in-line operation.

In this case, the method of assigning an identifier (ID) to a component by using a sticker, an imprinting, etc. and tracking the ID has been used, but if the shape of a material is remarkably changed when processing the material, the tracking is often difficult. For example, if an ID is imprinted on a material in an initial stage and the material passes through a computerized numerical control (CNC) facility, almost all of the ID is removed, and the ID can be removed also in the heat/chemical process. Accordingly, every time when a material is output from a facility, an imprinting of the ID has been required again, and accordingly, there has been a problem that the process time increases.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a server which can consistently track a location of a material related to a facility based on log information obtained from different facilities that perform related operations and by using the correlation thereof, and a controlling method thereof.

Additional aspects will be set forth in part in the description which follows and, in part, will be apparent from the description, or may be learned by practice of the presented embodiments.

In accordance with an aspect of the disclosure, a server is provided. The server includes a communicator, a memory configured to store computer executable instructions, and a processor configured to execute the computer executable instructions to, receive first log information related to a first material generated in a first facility among a plurality of facilities, the first facility belonging to a first process among a series of processes for manufacturing a product through the communicator, generate an identifier (ID) regarding the first material, generate tracking information on the first material based on the first log information, assign the ID to the tracking information, receive a plurality of pieces of second log information generated in a second facility among the plurality of facilities, the second facility belonging to a second process that follows the first process, through the communicator, identify second log information corresponding to the first material among the plurality of pieces of second log information based on the first log information included in the tracking information, and update the tracking information based on the identified second log information.

The processor may be configured to execute the computer executable instructions to generate the ID regarding the first material based on a time when the first material is put in the first process.

The first log information may include a time when the first material is put in the first facility and a time when the first material is put out of the first facility, and each of the plurality of pieces of second log information may include a time when an arbitrary material is put in the second facility and a time when the arbitrary material is put out of the second facility.

The processor may be configured to execute the computer executable instructions to identify second log information including a time when an arbitrary material is put in, which corresponds to a time when the first material is put out, which is included in the first log information, among the plurality of pieces of second log information.

The processor may be configured to execute the computer executable instructions to receive an image captured by a camera for monitoring a third facility that belongs to a third process that follows the second process through the communicator, generate image-based log information related to a movement of the first material in the third facility based on the image, and secondly update the updated tracking information based on the image-based log information.

The processor may be configured to execute the computer executable instructions to identify the first material being put in and out of the third facility based on the image, and generate the image-based log information including a time when the first material is put in the third facility and a time when the first material is put out of the third facility.

The image may include successive frame images, and the processor may be configured to execute the computer executable instructions to identify the first material in a first frame image corresponding to a time when the first material is put out of the second facility among the frame images, and identify the first material being put out of the third facility by tracking the identified first material in frame images following the first frame image.

The processor, based on the third facility being a conveyer, may be configured to execute the computer executable instructions to calculate a speed of the first material which is put in the conveyer and transferred, based on the received image, and identify the first material among a plurality of arbitrary materials put out from the conveyer in the image, based on the calculated speed.

The processor, based on the third facility being a tray having a plurality of material load spaces, may be configured to execute the computer executable instructions to identify a space where the first material is stacked in the tray based on the image, and generate the image-based log information by including information on the identified space.

The processor may be configured to execute the computer executable instructions to receive a plurality of pieces of third log information generated in a fourth facility that belongs to a fourth process following the third process through the communicator, identify third log information corresponding to a time when the first material is put out of the third facility in the plurality of pieces of third log information based on the image-based log information, and thirdly update the secondly updated tracking information based on the identified third log information.

The processor, based on a first product being completed based on the first material, may be configured to execute the computer executable instructions to store a serial number recorded on the first product in the memory in association with the ID.

The processor, based on the serial number being input, may be configured to execute the computer executable instructions to provide the tracking information to which the ID is assigned.

The processor, based on the serial number being input, may be configured to execute the computer executable instructions to obtain information on at least one facility where the first material passes through, based on the tracking information to which the ID is assigned, obtain an ID regarding a material different from the first material that passes through the at least one facility, and provide the serial number which is stored in association with the obtained ID.

In accordance with an aspect of the disclosure, a method for controlling a server is provided. The method includes receiving first log information related to a first material generated in a first facility among a plurality of facilities, the first facility belonging to a first process among a series of processes for manufacturing a product, generating an ID regarding the first material, generating tracking information on the first material based on the first log information, assigning the ID to the tracking information, receiving a plurality of pieces of second log information generated in a second facility among the plurality of facilities, the second facility belonging to a second process that follows the first process, identifying second log information corresponding to the first material among the plurality of pieces of second log information based on the first log information included in the tracking information, and updating the tracking information based on the identified second log information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6, 7A, and 7B are views illustrating a procedure for generating material tracking information performed by a server according to various embodiments of the disclosure;

FIG. 8 is a view illustrating an example of a procedure for generating a virtual log performed by a server according to an embodiment of the disclosure;

FIG. 10 is a view illustrating an example of a method for identifying an ID of each material in a tray according to an embodiment of the disclosure;

Throughout the drawings, like reference numerals will be understood to refer to like parts, components, and structures.

DETAILED DESCRIPTION

Figure 1:
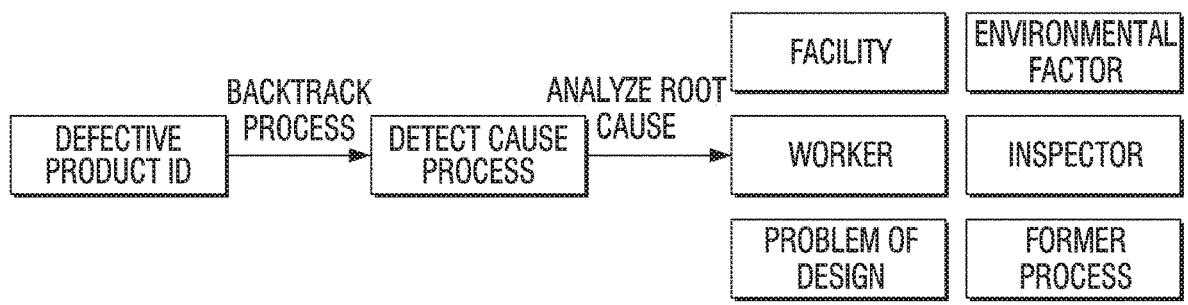
FIG. 1 is a view illustrating an example of a processing procedure in a case in which a defective product is found according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, the term "has", "may have", "includes" or "may include" indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

In the embodiment of the disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor.

If it is described that a certain element (e.g., first element) is "(operatively or communicatively) coupled with/to" or is "connected to" another element (e.g., second element), it should be understood that the certain element may be connected to the other element directly or through still another element (e.g., third element). Meanwhile, when it is mentioned that one element (e.g., first element) is "directly coupled" with or "directly connected to" another element (e.g., second element), it may be understood that there is no element (e.g., third element) between one element and another element.

The expression "configured to (or set to)" used in one or more embodiments may be replaced with "suitable for," "having the capacity to," "designed to," "adapted to," "made to," or "capable of" according to a context. The term "configured to (set to)" does not necessarily mean "specifically designed to" in a hardware level. Under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., central processing unit (CPU) or application processor) that can perform the corresponding operations through execution of one or more software programs stored in a memory device.

The terms used in the description are used to merely describe a specific embodiment, but may not intend to limit the scope of other embodiments. Unless otherwise defined specifically, a singular expression may encompass a plural expression. All terms including technical and scientific terms used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure should not be interpreted as excluding the embodiments of the disclosure.

In an embodiment, the term 'production process' refers to the procedure for manufacturing a product. The process of making a complete product/component is defined by being subdivided into a plurality of specific processes, and each specific process can be divided again into a micro process by a function. In the embodiment, the 'production process' is used based on the micro process which is the smallest unit.

In the embodiment, the term 'facility' is an apparatus or device prepared to perform any operation or to make a product, a structure or a machine. The facility for a component process is, for example, a computerized numerical control (CNC) manufactural lathe (a facility that makes a figure by carving a metal material), a loading/unloading robot (A robot specialized for moving a metal material between facilities). The robot includes a sensor/camera for recognizing a material, robot arms, a transfer unit for moving between facilities, etc., and a computer apparatus for controlling the material, robot arms, transfer unit and which includes a network connection for receiving and transmitting a data/control signal), a conveyer (an apparatus that moves a material from a specific location to a different location), a test apparatus (A facility for measuring an external scratch, function, standard/size of a production product. There are a manual test apparatus controlled by a person and an automatic test apparatus controlled by a computer), a coloring apparatus (an apparatus that causes a chemical action on a metal material so that a desired color is covered on a surface of a metal), a cleaning machine (a facility that cleans foreign substances attached to the surface of a material in a cutting process) and the like.

In the embodiment, the term 'log' means a record of operation information of an automation facility used in a production process, which is made based on a time. The log is mainly stored in a computer apparatus in a facility. The log stored in the computer apparatus is collected intermittently by using a USB, etc., or collected in different storages automatically by an additional inner/outer collecting apparatus. The automatic facility operates based on the determination of itself, but mainly controlled by a center controller that directs an entire operation. In the controller, the facility operation condition or status is continuously reported so as to identify the current status of facility and send the control signal corresponding thereto to the facility.

Hereinafter the embodiment will be described in detail with reference to a drawing.

FIG. 1 is a view illustrating an example of processing progress in a case in which a defective product is found according to an embodiment of the disclosure.

Referring to FIG. 1, if a defective product (or material, component) is found, the process is traced back based on an identifier (ID) assigned to the product to find the cause process of the defect, and to find a facility, a worker, problems in designing, environmental causes, and the like.

According to embodiments, the database in which IDs of components, the tracking information mapped with the ID of the components can be constructed, and thus, the cause of the defect can be analyzed based on the tracking information.

A server according to the embodiments can collect log information from different facilities that perform operations related to each other, and generate the tracking information that may consistently track the location of the material related to the facility using the correlation of the collected log information.

In addition, the server according to an embodiment may generate virtual log (image-based log) based on the image captured by a camera for the location in which log information is not generated (e.g., spaces for workers, a conveyer, etc.).

Figure 2:
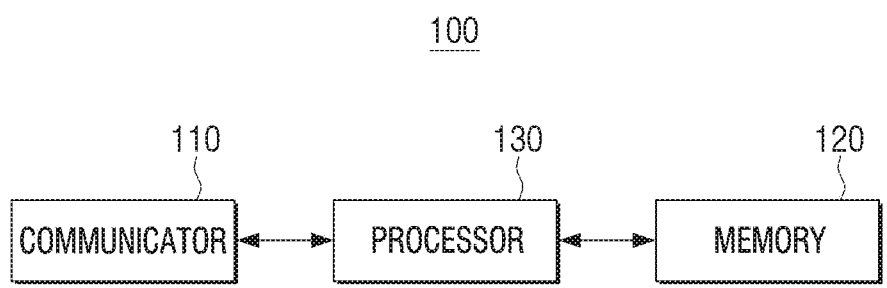
FIG. 2 is a block diagram illustrating a configuration of another server according to an embodiment of the disclosure.

FIG. 2 is a block diagram for illustrating a configuration of a server 100 according to an embodiment of the disclosure.

Referring to FIG. 2, the server 100 includes a communicator 110, a memory 120 and a processor 130. According to embodiments, some of the components can be omitted, and even if not illustrated, an appropriate hardware/software component which is well known to the person skilled in the related art can be additionally added to the server 100. For example, the server 100 may further include an input interface which may receive a user input (e.g., a button, a keyboard, a touch pad, etc.) and an output unit (e.g., a speaker, a display, etc.) which may output information. These additional components can be connected to the communicator 110.

The communicator 110, for example, may be connected to a network through wireless/wired communication and communicate with an external apparatus. The wireless communication, for example, may be via a cellular communication protocol and, for example, may use at least one among long-term evolution (LTE), LTE advanced (LTE-A), code division multiple access (CDMA), wideband CDMA (WCDMA), universal mobile telecommunications system (UMTS), wireless broadband (WiBro), and global system for mobile communications (GSM). In addition, wireless communication, for example, may include short distance communication. The short distance communication may, for example, include at least one of WiFi direct, Bluetooth, near field communication (NFC), or Zigbee. Wired communication may, for example, include at least one of universal serial bus (USB), high definition multimedia interface (HDMI), recommended standard-232 (RS-232), or plain old telephone service (POTS). Network 162 may include at least one of telecommunication network, for example, computer network (e.g., local area network (LAN) or wide area network (WAN)), Internet, or telephone network.

The communicator 110 may, for example, include a cellular module, a WiFi module, a Bluetooth module, a global navigation satellite system (GNSS) module (e.g.: global positioning system (GPS) module, global navigation satellite system (Glonass) module, Beidou module, or Galileo module), an NFC module, and a radio frequency (RF) module.

Each of the WiFi module, the Bluetooth module, the GNSS module or the NFC module, for example, may include a processor to process data which are transmitted/received through a corresponding module. According to an embodiment, at least some of (e.g., two or more than two) the cellular module, WiFi module, Bluetooth module, GNSS module and NFC module may be included in an integrated chip (IC) or an IC package.

The memory 120, for example, may include a built-in memory or an external memory. The built-in memory, for example, may include at least one of a volatile memory (e.g., dynamic random access memory (DRAM), static RAM (SRAM), or synchronous dynamic RAM (SDRAM), etc.) and a nonvolatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD)).

The external memory may include a flash drive, for example, a compact flash (CF), a secure digital (SD), micro-SD, mini-SD, an extreme digital (XD), a multimedia card (MMC) or a memory stick and the like.

The memory 120 may be accessed by the processor 130, and perform readout, recording, correction, deletion, update, and the like, on data by the processor 130.

In the embodiment, the term memory may include at least one of a memory which is provided separately from the processor 130, a ROM (not illustrated) and a RAM (not illustrated) in the processor 130.

The processor 130 controls an overall operation of the server 100. For example, the processor 130 may control a number of hardware or software elements connected to the processor 130 by driving an operating system or application, and perform various data processing and calculations. The processor 130 may be a CPU or a graphics-processing unit (GPU). The processor 130 may be implemented as at least one of a general processor, a digital signal processor, an application specific integrated circuit (ASIC), a system on chip (SoC), a microcomputer (MICOM), etc.

The processor 130 may perform various functions by executing computer executable instructions stored in the memory 120.

The processor 130 may generate tracking information on the material based on the log information generated in a plurality of facilities by executing the computer executable instructions stored in the memory 120.

According to an embodiment, by executing the computer executable instructions stored in the memory 120, the processor 130 may receive the first log information related to the first material generated in the first facility among the plurality of facilities for manufacturing products through the communicator 110, generate an ID for the first material, generate tracking information on the first material including the first log information, assign the ID generated on the tracking information, receive a plurality of pieces of second log information generated in the second facility among the plurality of facilities through the communicator 110, identify the second log information corresponding the first material among the plurality of pieces of second log information based on the first log information included in the tracking information, and update the tracking information by adding the identified second log information to the tracking information.

The ID for the first material may be added to the first material from the time point when the material accesses a production line. For example, an ID may be generated based on the capturing time point of a camera included in the robot that inputs the first material. For another example, an ID can be generated based on the time point when an input worker puts the first material in the production line manually and pushes a button, etc.

The ID of the first material may be generated by including the information on the location, time, a subject of the input when the material is initially put in the process. Accordingly, an intrinsic ID can be assigned to each material. Alternatively, a real ID itself recorded by a subcontractor that initially supplies the first material may be used. The ID for the first material may be generated in the server 100 or generated by the facility that initially puts the first material into the process. If the facility that initially puts the first material into the process generates the ID for the first material, the facility may generate first log information by further including the ID generation history.

The first log information may include the time when the first material is put in and out of the first facility, and each of the plurality of pieces of second log information may include a time when an arbitrary material is put in and out of the second facility. In this case, the processor 130 may identify the second log information including the time when the arbitrary material is input, corresponding to the time when the first material is put out, included in the first log information, among the plurality of pieces of second log information.

Each facility generates log information in real time and the server 100 may receive the generated log information in real time. The server 100 may identify the location of the first material in real time based on the relation of facilities and the relation of operation time of each facility shown in the log information, and generate tracking information.

The section where the facilities that generate log information may be called an automation section and the section where the facility or a worker that may not generate the log information may be called a non-automation section. For example, the section wherein a person inspects and moves a material manually or the section wherein a conveyer moves a material is the non-automation section.

Since the log information is not generated in the non-automation section, an interruption with respect to the tracking information on a material may occur.

Accordingly, the interruption with respect to the tracking information may be mitigated by installing an image capturing apparatus (e.g., a camera) in the non-automation section and by generating virtual log information based on the image captured by the image capturing apparatus.

According to an embodiment, the processor 130 may generate virtual log information based on the image captured in the camera, and update the tracking information based on the virtual log information. For example, the virtual log information regarding a manual operation may be generated based on the image which captures a worker, the virtual log information on the movement of the material on a conveyer may be generated based on the image that captures the conveyer, and the tracking information can be updated based on the generated virtual log information.

If a following facility of the first facility of the automation section is the second facility of the non-automation section, the processor 130 may receive the image captured through a camera for monitoring the second facility corresponding to the following stage of the first facility through the communicator 110, and generate the virtual log information related to the movement of the first material in the second facility based on the received image. Also, the processor 130 may update the tracking information by adding the virtual log information generated in the tracking information on the first material generated based on the log information generated in the first facility.

In this case, the processor 130 may identify the first material being put in and out of the second facility based on the image received from the camera, and generate virtual log information including the time when the first material is put in and out of the second facility.

A camera may capture an image or a still image.

According to an embodiment, the image received from a camera may include successive frame images, a processor 130 may identify the first material from the first frame image corresponding to the time when the first material is put out of the first facility among the frame images, and identify the first material being put out of the second facility by tracking the first material from frame images following the first frame image. In this case, an object tracking method based on an image may be used. In the case of an environment of a factory, the shape of the material to be tracked is known in advance, and thus, the object tracking based on an image may be easily performed.

The number of the camera that captures a facility may be one or more. If there are a plurality of cameras that capture the facility, the capturing scopes of the plurality of cameras may overlap each other.

If the second facility is a conveyer, the processor 130 may calculate the speed of the first material put in a conveyer and transferred, based on the image of the conveyer, and based on the calculated speed, may identify the first material among a plurality of arbitrary materials put out of the conveyer in the image.

If the first material gets out of the area in which a specific camera captures, the first material can be identified in the next area through a space-time mapping with the image captured by the camera that captures next area.

According to another embodiment, if a stage following the first facility of the non-automation section is a second facility of the automation section, the processor 130 may receive the plurality of pieces of second log information generated in the second facility corresponding to the following stage of the first facility through the communicator 110, and identify the second log information corresponding to the time when the first material is put out of the second facility among the plurality of pieces of second log information, based on the virtual log information generated through the image of the first facility. In addition, the processor 130 may update the tracking information by adding the identified second log information to the tracking information on the first material generated based on the virtual log information.

As such, the processor 130 may generate the tracking information based on the correlation of the log information and the virtual log information generated in the facilities when moving from an automation section to an automation section, moving from an automation section to a non-automation section, or moving from a non-automation section to an automation section.

Meanwhile, the processor 130 may generate the tracking information by including all of log information or by including some of detailed information included in the log information. The processor 130 may generate the tracking information including new information gained as a result of the analysis of the log information. That is, the processor 130 may generate the tracking information by appropriately processing the log information.

Figure 3:
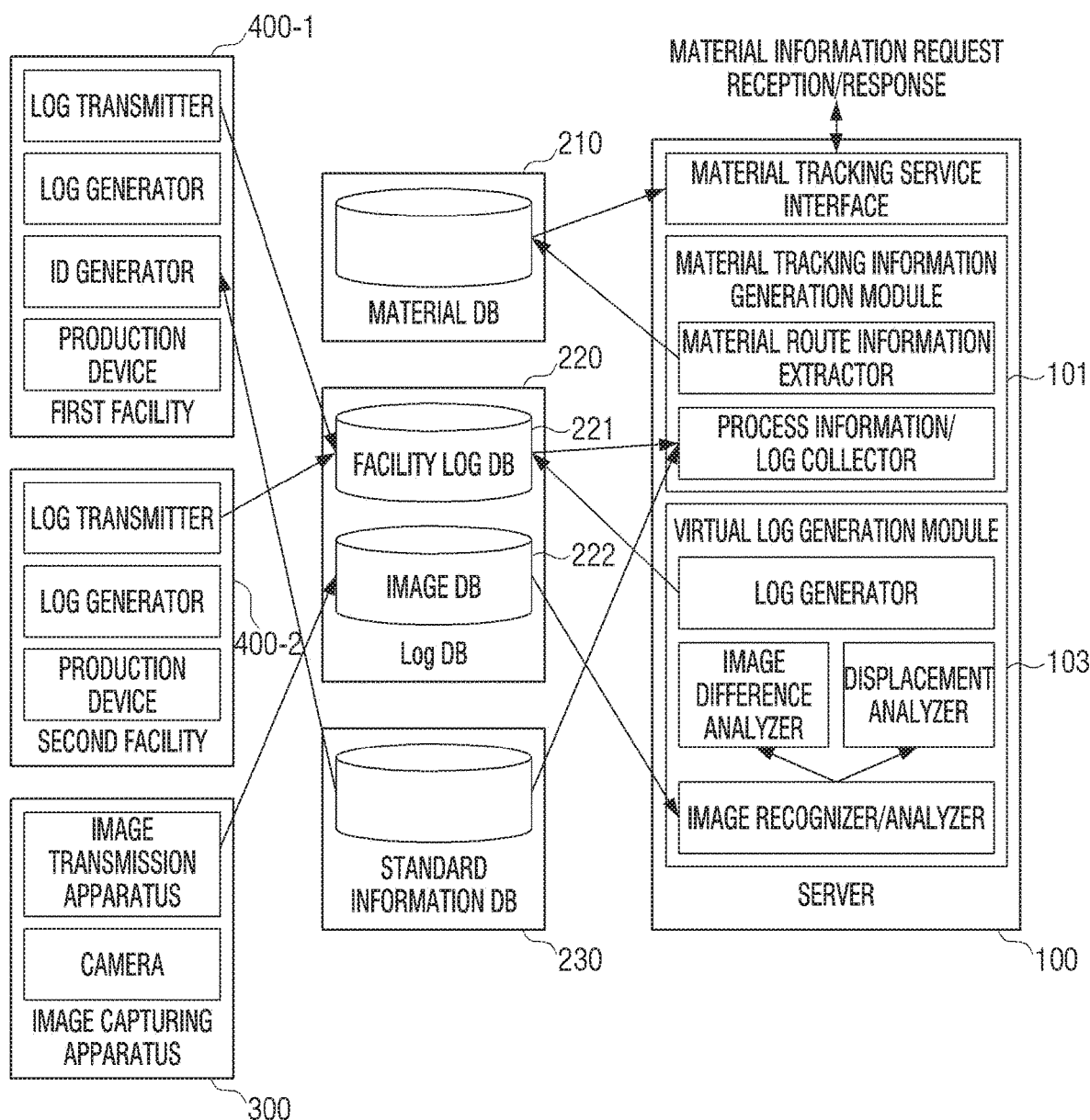
FIG. 3 is a view illustrating a system according to an embodiment of the disclosure.

FIG. 3 is a drawing illustrating a system according to an embodiment of the disclosure.

Referring to FIG. 3, the system may include a plurality of facilities 400-1 and 400-2, an image capturing apparatus 300, a plurality of DBs 210, 220 and 230, and the server 100. The server 100 may be the server 100 illustrated in FIG. 2. The server 100 and the plurality of DBs 210, 220, and 230 may be separate apparatuses or at least one of the plurality of DBs 210, 220, and 230 may be included in the server 100.

Two facilities 400-1 and 400-2 are illustrated in FIG. 3, but this is merely an example for description, and the number of the facility included in the system is not limited thereto. One image capturing apparatus 300 is illustrated in FIG. 3, but since the image capturing apparatus 300 may be disposed in any required location in the system, and thus, the system may include a plurality of capturing apparatuses 300.

The log DB 220 may store the log information collected from the plurality of facilities 400-1 and 400-2. In addition, the log DB 220 may store the image of a specific facility or a worker in the collected process from the image capturing apparatus 300.

The standard information DB 230 may include the information on the order of each process, and the information on the relation of operations between the facilities in the processes (e.g., the information regarding to where a specific facility passes a material and from where the facility receives a material). This information may be in a form of an operation direction. In addition, the standard information DB 230 may store overall information on the facilities (e.g., location, ID, function, setting value of the facility).

The server 100 may include a material tracking information generation module 101 and a virtual log generation module 103. The material tracking information generation module 101 and the virtual log generation module 103 may be implemented as a software. If the material tracking information generation module 101 and the virtual log generation module 103 are implemented as a software, they are stored in a memory 120 or the memory of the processor 130, and the function may be executed when the processor 130 loads the software stored in the memory.

The material tracking information generation module 101 may generate the tracking information on the material based on the log information obtained from the log DB 220, and stored the tracking information in the material DB 210. Also, if there is new log information to be added to the tracking information to which the specific ID stored in the material DB 210 is assigned, the material tracking information generation module 101 obtains the tracking information to which the specific ID stored in the material DB 210 is assigned and updates the new log information, and stores the updated tracking information in the material DB 210. The generation and update of the tracking information may be performed in real time according to the movement of the material or performed after the material is completed as a component.

With regard to the facility or a worker with which log information may not be generated, the virtual log generation module 103 may generate virtual log information based on the image of the facility or the worker. The virtual log information is treated as general log information so as to be used to generate or update the tracking information by the material tracking information generation module 101.

In addition, if the request of information on the material is received from a user, the server 100 may provide the tracking information on the material obtained from the material DB 210 through the material tracking service interface. For example, when a material is processed and a component is completed, if there is a defect in the component, the server 100 may provide the tracking information corresponding to the ID of the corresponding material input by a user.

Figure 4:
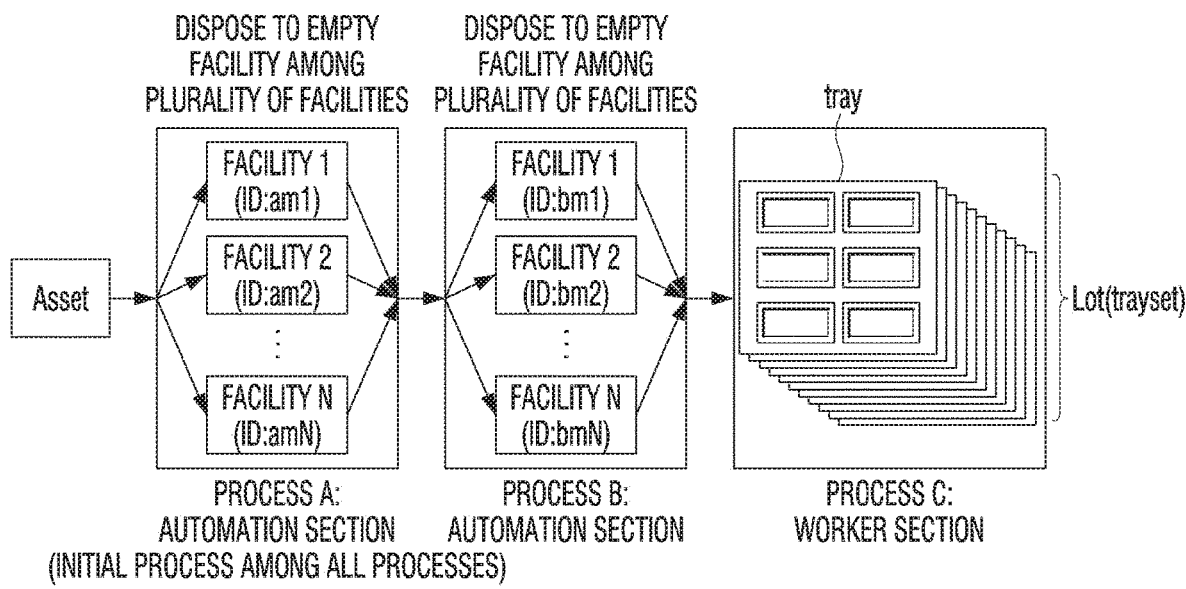
FIG. 4 is a view illustrating an example of generating tracking information in an automation section according to an embodiment of the disclosure.
Figure 5:
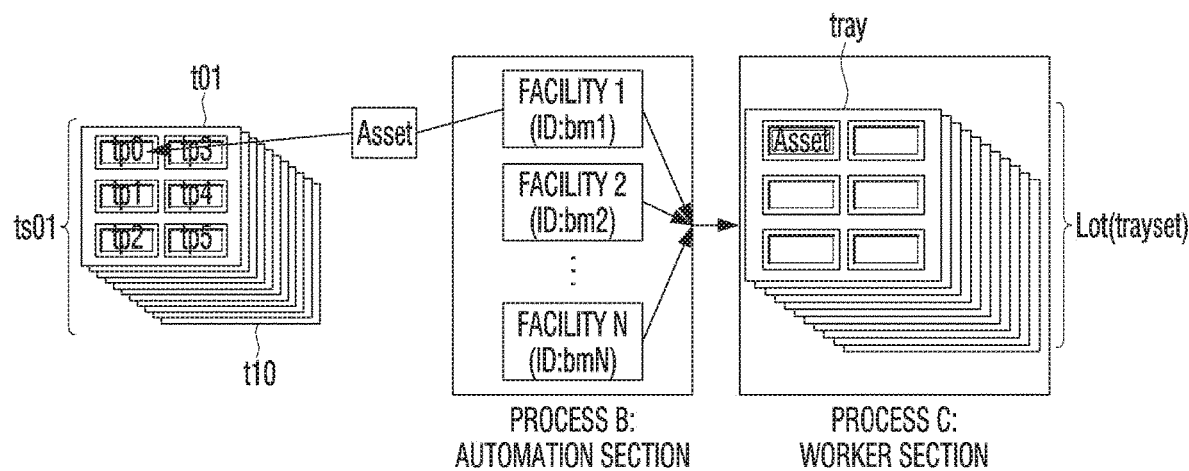
FIG. 5 is a view illustrating an example of generating tracking information in a non-automation section according to an embodiment of the disclosure.

FIGS. 4 to 5 are views illustrating a process of generating tracking information in an automation section and in a non-automation section.

Suppose that there are process A (automation section), process B (automation section), and process C (worker section (non-automation section)), and the standard information DB 230 stores the information in a form of an operation direction which that the operations are processed in the order of process A→process B→process C.

FIG. 4 is a view illustrating an example of a procedure of generating tracking information in an automation section according to an embodiment of the disclosure. Suppose that facility 2 handles a material in process A and facility 1 handles a material in process B.

At the moment when facility 2 (am2) in process A grabs a material, facility 2 may generate an ID (ID: 0031) regarding the material, and generate the log information including the generated ID. At the moment when facility 2 (am2) in process A passes the material of ID 0031 to facility 1 (bm 1) of process B, the location of the material of ID 0031 is added to the log information. In this case, if facility 2 (am 2) of process A does not know by itself that the location where the material of ID 0031 should be passed is facility 1 (bm 1) of process B, facility 2 (am2) may obtain the operation direction from the standard information DB 230 and identify the location where the material should be passed. Alternatively, the server 100 may analyze the log information of facility 2 (am 2) of process A and facility 1 (bm 1) of process B and the operation direction obtained from the standard information DB 230, and confirm that facility 2 (am 2) of process A passes the material to facility 1 (bm 1) of process B. Facility 1 (bm 1) of process B may receive the material of ID 0031 and generate log information, and the server 100 may re-confirm the change of location of the material of ID 0031 based on the log information generated in facility 1 (bm 1) of process B. The server 100 may generate the tracking information 410 on the material of ID 0031.

FIG. 5 is a view illustrating the procedure of generating tracking information in a non-automation section according to an embodiment of the disclosure. Suppose that facility 1 handles a material in process B and then moves a bundle of materials to the space of process C.

Facility 1 (bm 1) of process B may put the material of ID 0031 on an empty space of the tray in the facility and generate log information. Facility 1 (bm 1) of process B may move ts01 in which material of ID 0031 is included to process C and generate log information.

Facility 1 (bm 1) of process B may initially put ts01 to process C and generate log information that includes the time point thereof, and this time point may be a trigger point when a camera captures process C, generates an image and generates the information on the capturing time point. In addition, the camera may capture the image regarding the change of location of all materials in the worker section.

The server 100 may identify the changed locations of the material of ID 0031 by comparing the log information generated in facility 1 (bm 1) of process B, the image in the initial input time captured by the camera, and the remaining images, and update the pre-stored tracking information, and generate the updated tracking information 420.

In this case, the server 100 may track the material based on the recognition of an object in an image. The shape of the material is already known, and thus, the recognition rate thereof is high. In addition, due to the nature of the process, a worker handles one material at a time (because of fear of damage of a component, more than one material is not handled at the same time), and a lighting is bright in the worker space for careful handling of a material, and thus, there are a few errors in recognizing an image. In addition, due to the nature of the feature of a factory, there is no obstacle in the capturing section, and thus, there are a few errors when recognizing an image. In addition, the materials are handled by being grouped in a predetermined form (e.g., moves by being put in a tray or a lot), there may be no ambiguity when analyzing an image.

There may be three circumstances when entering from an automation section to a non-automation section: 1) the case in which a final output point of an automation section is a conveyer, 2) the case in which a final output point of an automation section is a specific facility (a robot that grabs a material), and 3) the case in which a final output point of an automation section is a storage of a component (tray).

1) If a final output point of an automation section is a conveyer, the ID of a material may be recognized by calculating the moving order and speed of the material based on the image generated by constantly capturing the conveyer. In this case, since the materials move in a line, the recognition accuracy is high (refer to FIGS. 8 to 9).

2) If a final output point of an automation section is a specific facility (a robot that grabs a material), the ID of the material can be recognized from the ID of the specific facility and the log information thereof.

Figure 11:
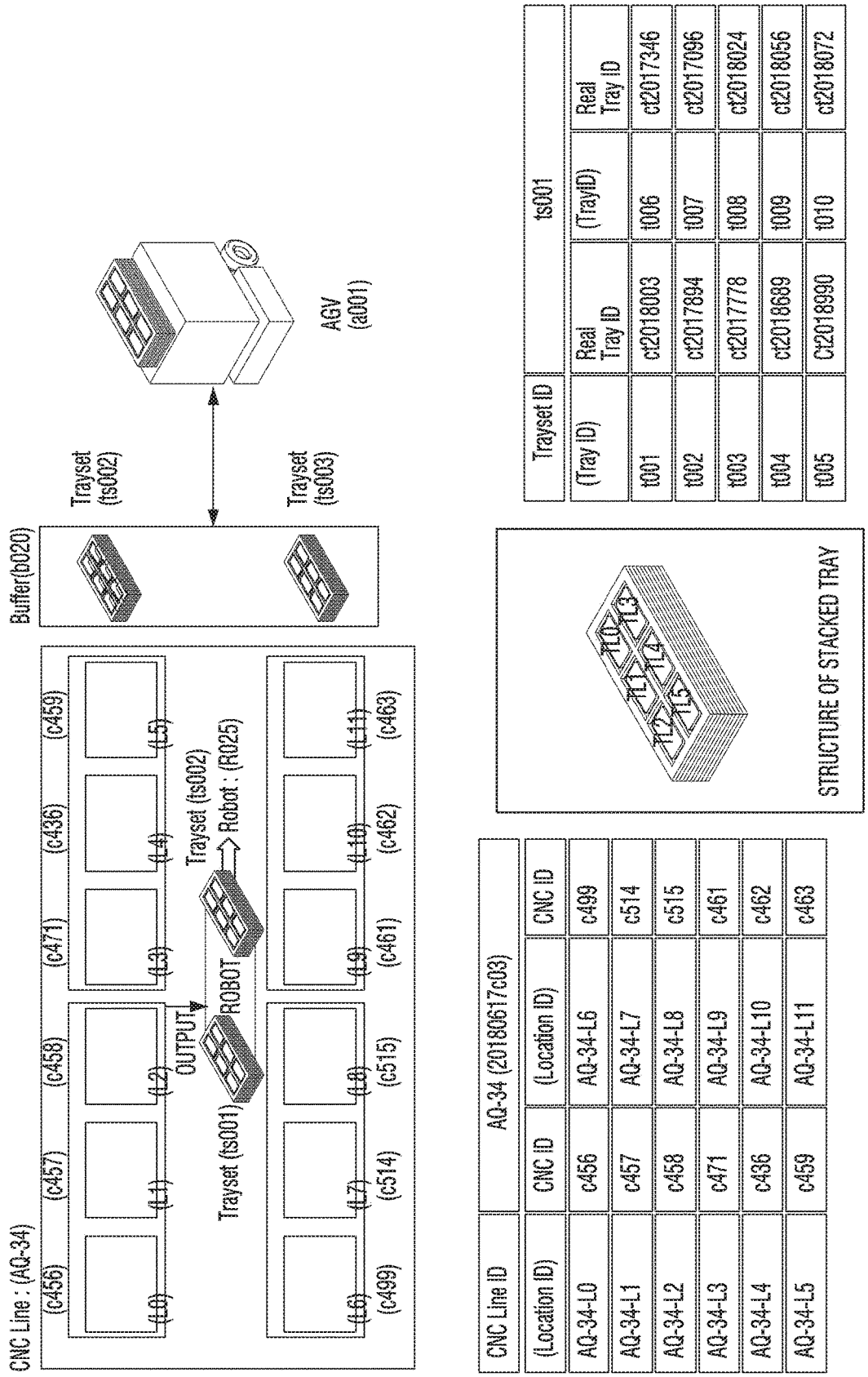
FIG. 11 is a view illustrating an example of a procedure for tracking a material based on an ID assigned to each facility according to an embodiment of the disclosure.

3) If a final output point of an automation section is a storage of a component (tray), because all trays are regular (e.g., line/column formation) and has a consistent structure, the ID of the material can be easily recognized by recognizing an image (refer to FIGS. 10 and 11).

Figure 6:
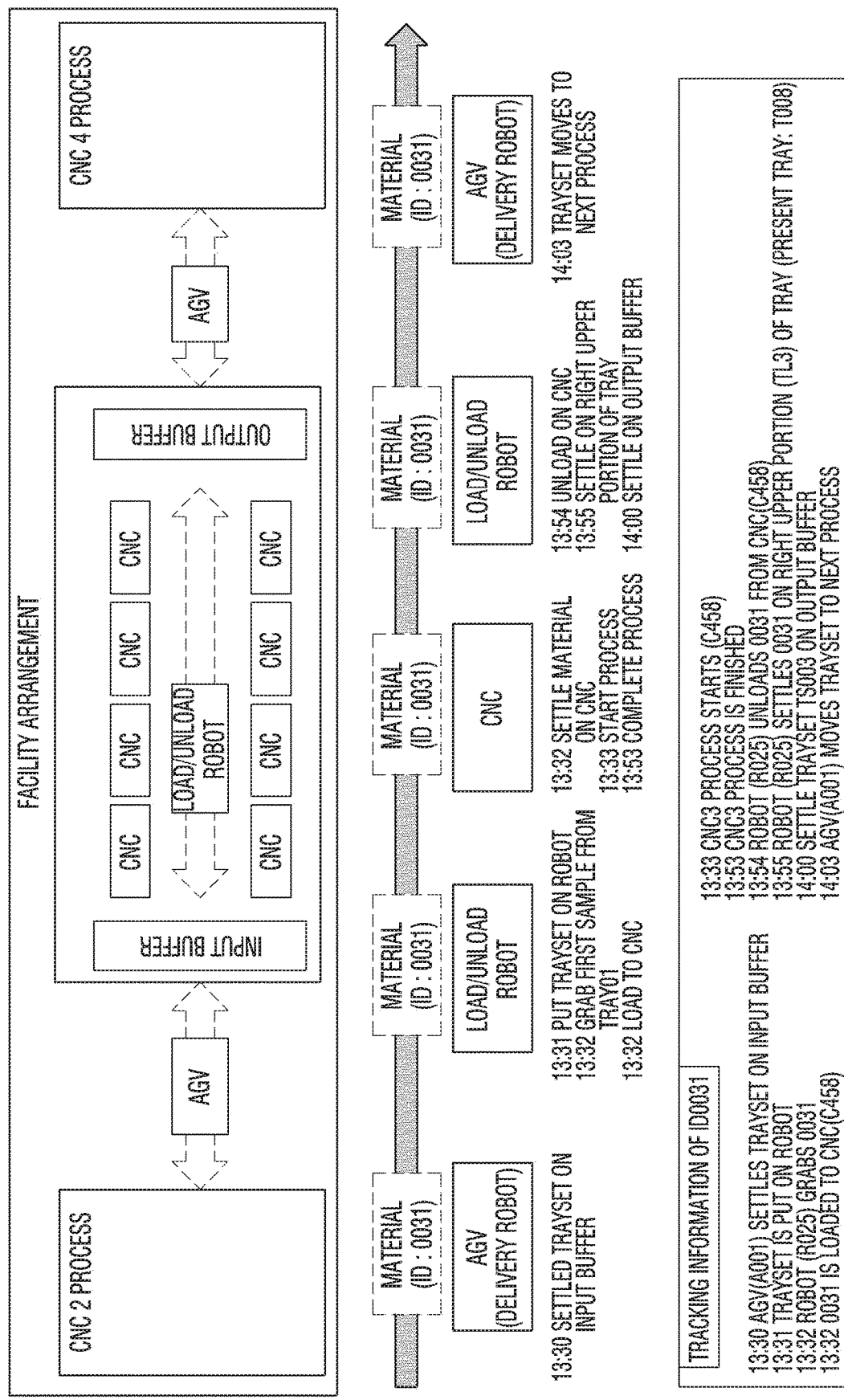
Figure 7A:
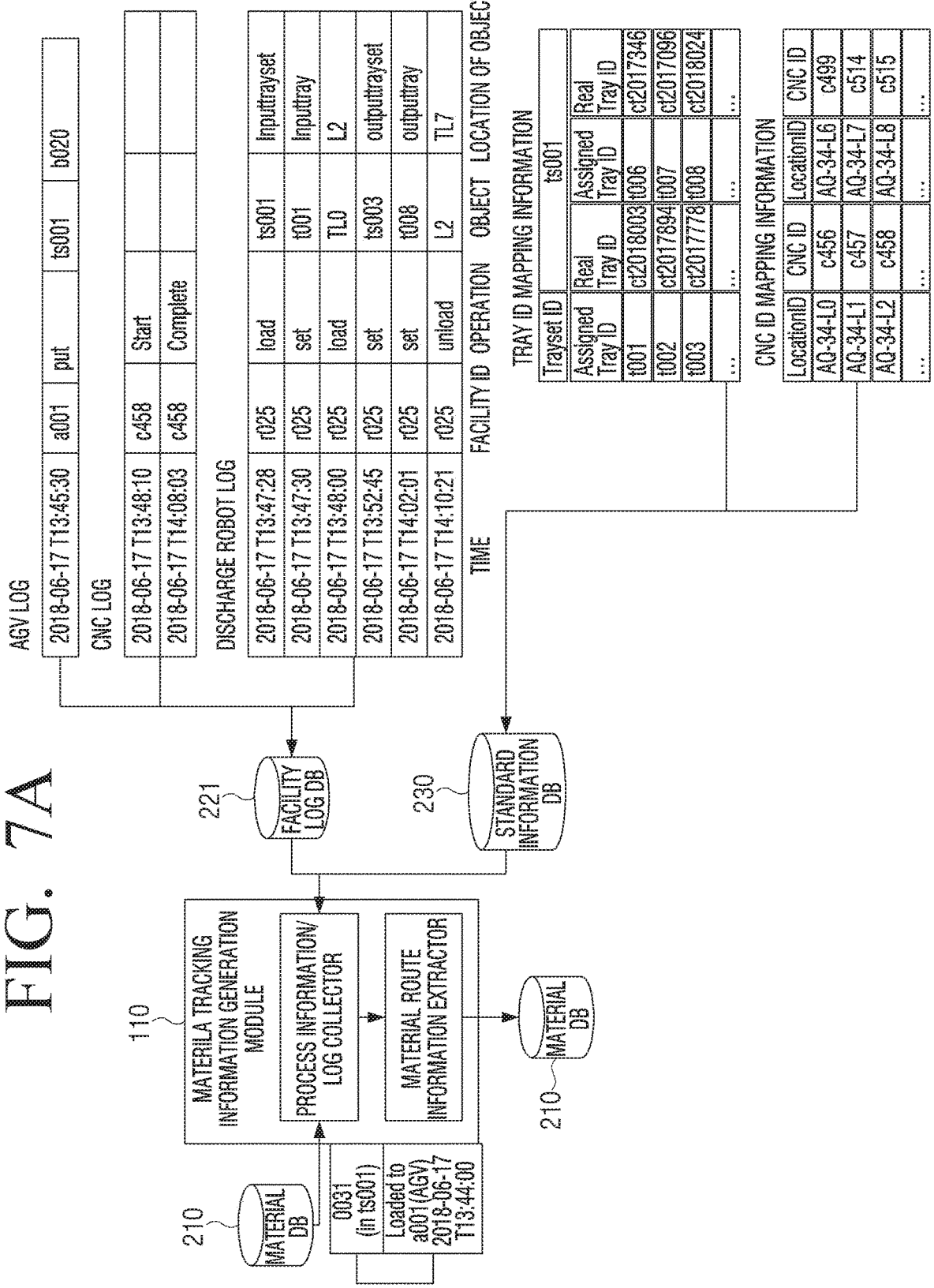

FIGS. 6, 7A, and 7B are views for describing a material tracking information generation module 101 according to various embodiments of the disclosure.

FIG. 6 is a view illustrating an example of log information generated according to a moving route of one material according to an embodiment of the disclosure.

Referring to FIG. 6, a logistics robot (AGV) shuttles between CNC 2 process and CNC 3 process and moves a material from CNC 2 process to CNC 3 process. In addition, the AGV shuttles between CNC 3 process and CNC 4 process and moves the material from CNC 3 process to CNC 4 process.

On reviewing inside of CNC 3 process specifically, a number of CNC facilities are arranged in two lines, and a loading/unloading robot moves between the lines and brings the material from an input buffer and puts the material in an empty CNC facility, and takes out the material and puts the material on an output buffer.

The tracking information on the moving route of the material (ID: 0031) may be generated based on the log information of each facility.

FIG. 7A is a view illustrating an example of tracking information generation procedure of the material tracking information generation module 101 according to an embodiment of the disclosure.

Referring to FIG. 7A, the material tracking information generation module 101 may collect the pre-stored tracking information (tracking information of T13:44:00) to which ID 0031 is assigned, from the material DB 210. In addition, the material tracking information generation module 101 may collect the log information from the log DB 220 in order to update the tracking information to the following log information. In this case, the information in the form of an operation direction collected from the standard information DB 230 and ID mapping information of each facility can be used.

The tracking information generation module 101 may generate the tracking information on ID 0031 based on the collected information (refer to FIG. 7B). The generated tracking information may be added to the material DB 210. With the added tracking information, the tracking information to which pre-stored ID 0031 is assigned may be updated. The tracking information may include the information on a time, material ID, operation, handling object, and location.

FIG. 8 is a view illustrating an example of a virtual log generation procedure of the virtual log generation module 103 according to an embodiment of the disclosure.

FIG. 8 illustrates a conveyer and a robot that puts a material in the conveyer and picks up the material from the conveyer and puts the material into a testing machine.

A camera continuously may capture an image at the time point when the robot puts the material in the conveyer, and continuously capture an image at the time point when the robot grabs the material on the conveyer. Then, the camera may transmit the captured image to the image DB 222.

The virtual log generation module 103 may generate a virtual log based on the captured images obtained from the image DB 222.

Specifically, the virtual log generation module 103 may collect the captured images from the image DB 222, and calculate the moving speed and direction of the material by analyzing the images collected from a displacement analyzer. In addition, in the image difference analyzer, the images of the same material may be selected, and the operation (put in, grab, etc.) may be analyzed. In addition, in the log generator, the virtual log regarding 'input stage' and 'grabbing stage of a robot' may be generated. In this case, the same virtual material ID is assigned to the same materials.

The virtual log generation module 103 may store the generated virtual log information in the facility log DB 221.

Figure 9:
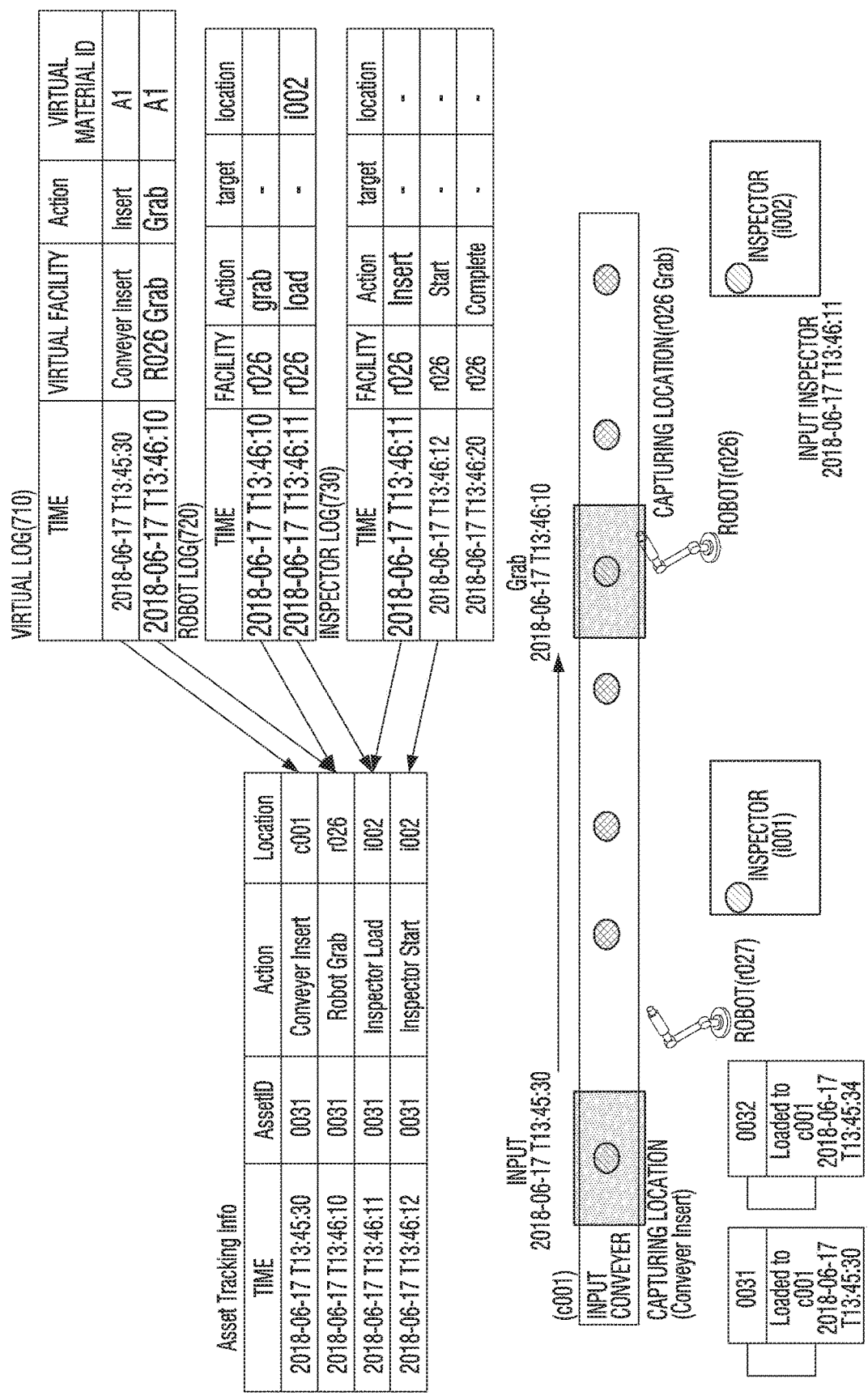
FIG. 9 is a view illustrating a procedure for generating tracking information based on virtual log information performed by a server according to an embodiment of the disclosure.

FIG. 9 is a view illustrating the procedure that the material tracking information generation module 101 generates tracking information based on the log information generated in the facilities and the virtual log information generated in the virtual log generation module 103 according to an embodiment of the disclosure.

Referring to FIG. 9, the material tracking information generation module 101 may map the virtual log information generated based on the log information and an image generated in the facility, and generate the tracking information of the material.

Specifically, the material tracking information generation module 101 may collect the plurality of pieces of virtual log information from a facility log DB 221 and extract the plurality of pieces of log information 710 having the same virtual material ID by using the virtual material ID (A1, A2

. . . ) of the plurality of pieces of virtual log information. In addition, the material tracking information generation module 101 may collect the plurality of pieces of log information 720 of a conveyer input robot and the plurality of pieces of log information 730 of a test machine from the facility log DB 221.

In addition, the material tracking information generation module 101 performs matching among the plurality of pieces of virtual log information 710 and the plurality of pieces of facility log information 720 and 730. In this case, the material tracking information generation module 101 compares the ID of the time point when the material is put in the conveyer and compares the plurality of pieces of virtual log information 710 and the plurality of pieces of facility log information 720 and 730, based on the speed of the material. Accordingly, the material tracking information generation module 101 may map the virtual material ID A1 with the material of ID 0031, and generate tracking information. The generated tracking information may be added to the material DB 210. The pre-stored tracking information may be updated based on the added tracking information.

FIG. 10 is a view illustrating an example of an ID identification method of each material on the tray according to an embodiment of the disclosure.

Referring to FIG. 10, the tray may be composed in the line and row formation of (x,y) formation. For example, the tray may be in the line and row formation of (2, 3) formation. The tray may stack the material as many as a predetermined number. For example, the tray may compose 1 LOT by 10 units (1 LOT=10 trays=60 materials).

Since a camera is included in a robot, when a material is grabbed from a tray, the log information regarding in which location of the tray the material was grabbed may be generated, and in the same manner, when the material is put on the tray, the log information regarding on which location of the tray the material was put may be generated. All shapes of the materials stacked on the tray are the same, and thus, the rule of recognizing the materials in the image is simple.

FIG. 11 is a view illustrating an example of a procedure for tracking a material based on the ID assigned to each facility according to an embodiment of the disclosure.

Referring to FIG. 11, if the AGV brings a material tray set to an input buffer, the robot may carry and put the material tray set in an empty CNC facility. The tray set is in a structure in which a number of trays are piled up. In the example of FIG. 11, ten trays form one set and in one tray, six materials can be disposed. After processing one tray, a robot may move the empty tray to the location of an output tray. When the process of the material is finished, the robot may take out the completely processed material from the CNC facility and if the completely processed materials are gathered so as to form a tray set, the tray set can be put on the output buffer. In addition, the AGV may move the tray set on the output buffer to the next process.

An ID is assigned for each tray and each facility, and the facilities may generate log information by indicating the location of a material as an ID of a facility when the material is put in or out. The information on the ID assigned for each tray and facility may be stored in the standard information DB 230.

If a component is completed based on the material, as described above, the ID assigned to the tracking information regarding the generated material may be imprinted on the component. Thereafter, the component may move to an assembly process and assembled with other components to complete a product, and the product may be assigned a serial number and sold to consumers.

If the first product is completed based on the first material, the processor 130 of the server 100 may store the serial number assigned to the first product in the memory 120 in association with the ID generated for the first material. In addition, if there is a defect in the first product, and if the serial number recorded on the first product is input, the processor 130 may provide tracking information to which the ID stored in association with the serial number is assigned. Accordingly, since it can be known that which facilities the defective product passed through, only the facilities which are suspected to have a problem may be inspected without inspecting all facilities.

According to another embodiment, if there is a defect in the first product, if the serial number assigned to the first product is input, the processor 130 may obtain the information on at least one facility to which the first material passed, based on the tracking information to which the ID generated regarding the first material is assigned, obtain the ID of the material different from the first material that passed the above at least one facility, and provide a serial number stored in association with the obtained ID. Accordingly, a recall service can be provided in advance for the product manufactured in the same facility with the defective product.

FIGS. 12 to 17 are flowcharts illustrating a tracking information generation method according to various embodiments of the disclosure.

Figure 12:
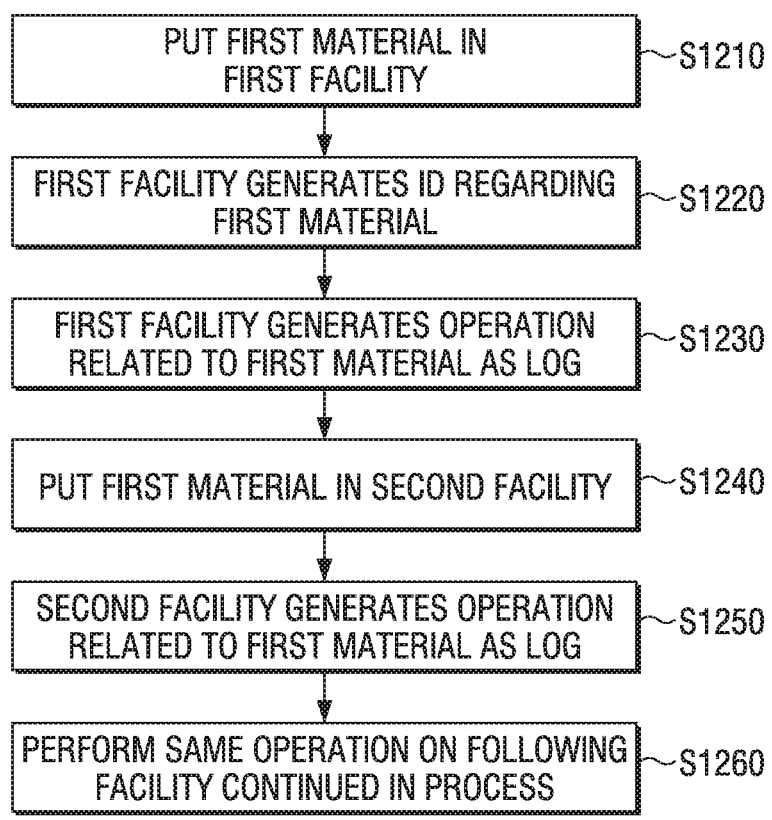
FIGS. 12, 13, 14, 15, 16, and 17 are flowcharts illustrating a tracking information generation method according to various embodiments of the disclosure.

FIG. 12 is a view illustrating an example of an ID generation stage and a log information generation stage for a material.

Referring to FIG. 12, the first material is put in the first facility in operation S1210. Here, the first facility may generate a virtual ID for the material in operation S1220. For example, the first facility (e.g., an input robot) may generate the ID for the material by using time information on the time point when the first material is grabbed.

In addition, the first facility may generate the log information on the operation related to the first material in operation S1230. In this case, the log information may include the information on the acquisition and discharge of the first material of the first facility. For example, if the first facility is an input robot and the second facility is a CNC facility, the input robot may generate the log information that includes the time point when the input robot grabs the first material, and the time point when the input robot passes the first material to the CNC facility. The log information may include the log regarding the ID assigning operation of the first facility.

If the first facility knows that the material should be passed to the second facility, the log information generated by the first facility may include that the first material is passed to the second facility. If the first facility does not know to where the material has to be passed, it can be confirmed that the first facility passed the first material to the second facility based on the information in the form of an operation direction stored in the standard information DB 200-3.

Thereafter, the first material is put in the second facility in operation S1240. The time point when the first material is put out of the first facility is the same as the time point when the first material is put in the second facility.

The second facility may generate the log information on the operation related to the first material in operation S1250. For example, if the second facility is a CNC facility, the log information including the time point when the process on the first material starts, and the time point when the process is finished may be generated.

Log information may be generated in the same manner in the next facility in the process in operation S1260.

The procedure for generating the tracking information based on the log information generated as described above will be described with reference to FIG. 13.

Figure 13:
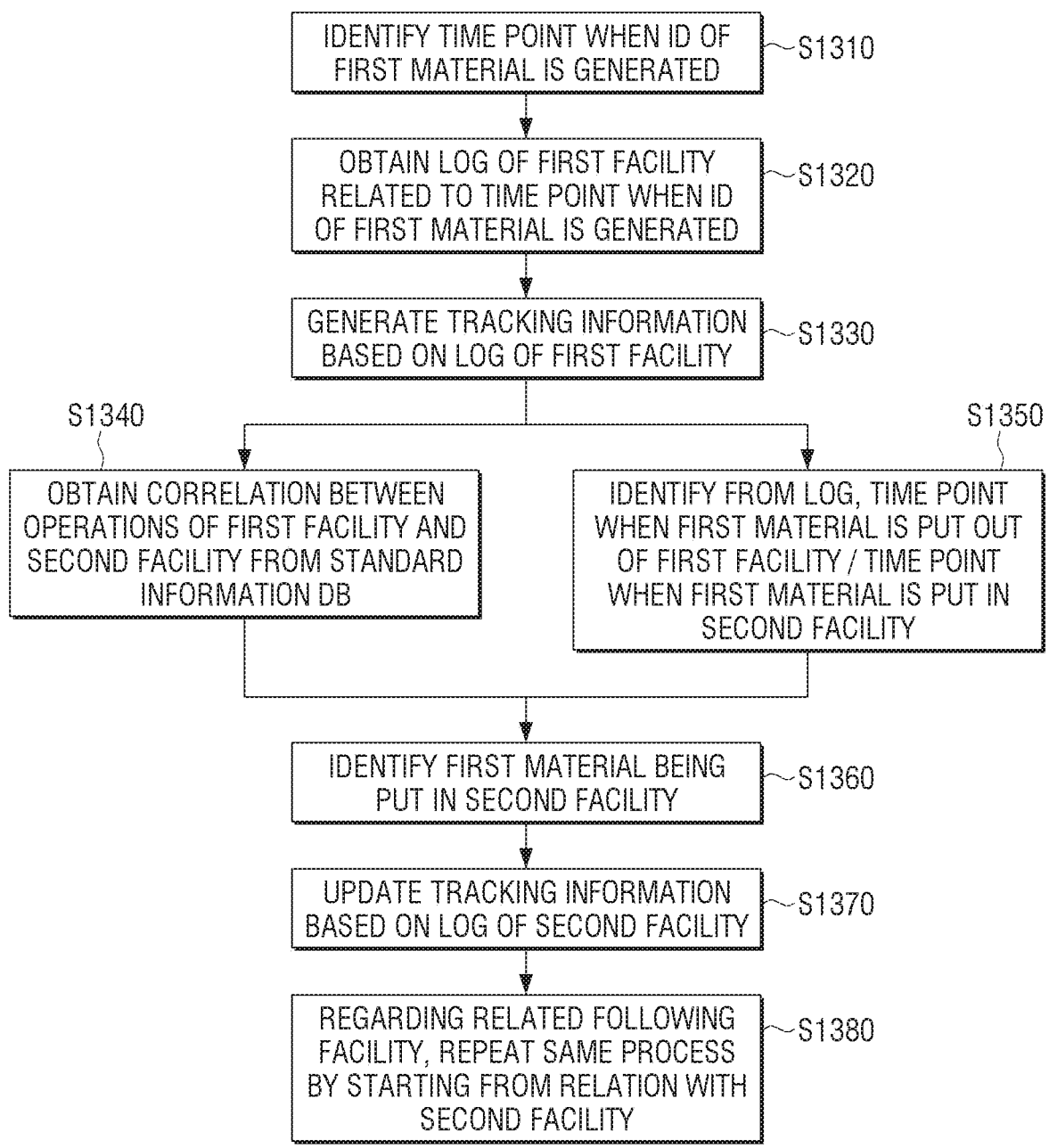

FIG. 13 is a flowchart illustrating an example of a method for generating tracking information for each material based on the log information.

Referring to FIG. 13, the server 100 may identify the time point when an ID is generated for a specific material in operation S1310. That is, the time point when the material is initially input can be identified. The time point when the material is initially input can be included in the log information generated in the first facility to which the material is initially input.

In addition, the server 100 may obtain the log information generated in the first facility related to the time point when the ID for the material is generated in operation S1320. Then, the server 100 may generate the tracking information based on the obtained log information in operation S1330. The tracking information may include the information related to the handling of the first material in the first facility.

The server 100 may obtain the information regarding the correlation of the operations between the first facility and the second facility from the standard information DB 230 in operation S1340. The information on the correlation of the operations may be in a form of an operation direction, and for example, the content that the first facility (e.g., an input robot) grabs a material and puts the material in the second facility (e.g., a CNC facility) may be recorded.

In addition, the server 100 may compare the time included in the log information of the first facility and the log information of the second facility and identify the time point when the first material is put out of the first facility and the time point when the first material is put in the second facility in operation S1350. Based on this, the server 100 may identify that the first material is put in the second facility in operation S1360.

The server 100 may update the tracking information based on the log information of the second facility in operation S1370. The updated tracking information may include the information on the handling of the first material in the first facility, information on that the first material moves from the first facility to the second facility, and information on the handling of the first material in the second facility.

In the same method described above, the server 100 repeats the same procedure in the next facility following the second facility, by starting from the second facility, in operation S1380. According thereto, the tracking information may be continuously updated until the first material is handled in the last facility of the process. Hereby, the tracking information to which the ID of the first material is assigned may be completed.

Figure 14:
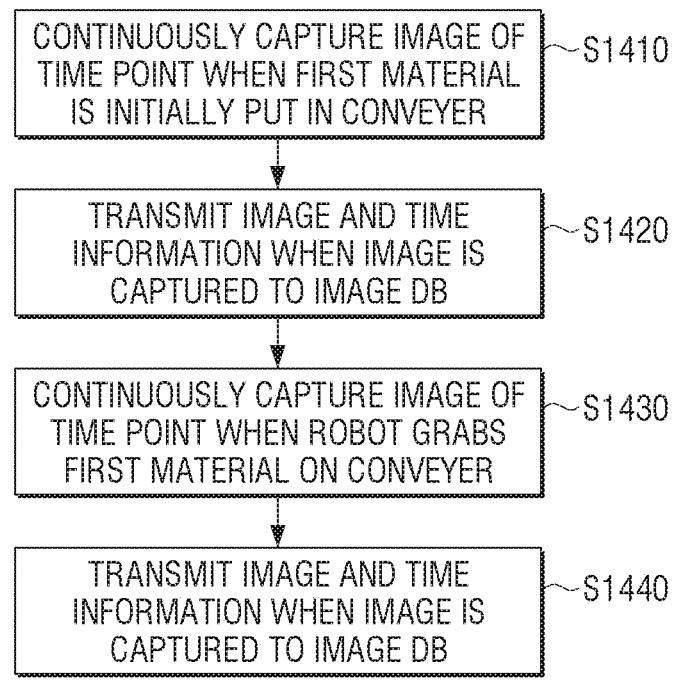

FIG. 14 is a flowchart illustrating an example of a procedure for generating virtual log information based on the image of a conveyer in which log information is not generated.

Referring to FIG. 14, first, a camera may continuously capture the first material in the time point when the first material is put in the conveyer, in operation S1410. For example, three or more than three images are continuously captured. The camera may be included in the robot that puts the first material in the conveyer. Alternatively, there may be an additional camera that captures the location where a material is put in the conveyer.

In addition, the image capturing apparatus may transmit the image captured in operation S1410 and the information on the time when the image is captured to the image DB 222, in operation S1420.

In addition, the image capturing apparatus may capture the image of the time point when the robot grabs the material on the conveyer in operation S1430. For example, three or more than three images are continuously captured. Here, the camera may be the same as or different from the camera that captures a material being put in the conveyer. The camera may be disposed in the robot that grabs the material on the conveyer. Alternatively, there may be an additional camera that captures the location where the material is put out of the conveyer.

The image capturing apparatus may transmit the image captured in operation S1430 and the information on the time when the image is captured to the DB 222, in operation S1440.

An example of the process for generating virtual log information based on the captured image and the information on the capturing time will be described with reference to FIG. 15.

Figure 15:
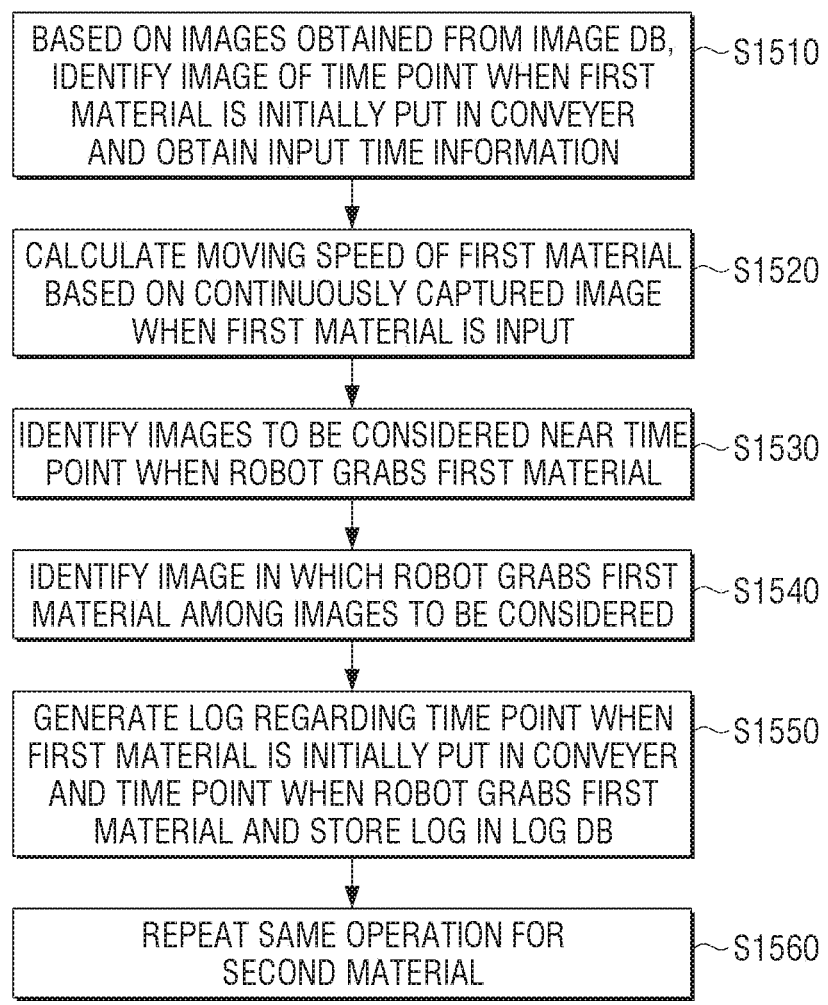

Referring to FIG. 15, the image recognizer/analyzer of the virtual log generation module 103 may obtain the information on the images continuously captured when the first material is initially put in the conveyer and the information on the capturing time of the image from the image DB 222, identify the image at the time point of an initial input by analyzing the obtained information, and obtain the information on the input time, in operation S1510.

In addition, the displacement analyzer of the virtual log generation module 103 may calculate the movement speed of the first material based on the images continuously captured when the first material is initially put in the conveyer, in operation S1520.

In addition, the virtual log generation module 103 may calculate the time when the first material goes near the robot by using the information on the distance between the location where the first material is input and the robot that takes out the material from the conveyer, and identify the images to be considered near the time point when the robot grabs the first material based on the calculated time in operation S1530.

In addition, the image difference analyzer of the virtual log generation module 103 may compare the image captured when the first material is input and the images to be considered, confirm the operation that the robot grabs the material, and identify the image in which the first material is included among the images to be considered, in operation S1540.

In addition, the log generator of the virtual log generation module 103 may generate the log information (virtual log information) including the time point when the first material is initially input and the time point when the robot grabs the first material on the conveyer, and store the generated log information in the facility log DB 221, in operation S1550.

With regard to the second material that moves after the first material on the conveyer, the same operation is repeated in operation S1560. Accordingly, the virtual log information may be generated for each of all materials that move on the conveyer.

Figure 16:
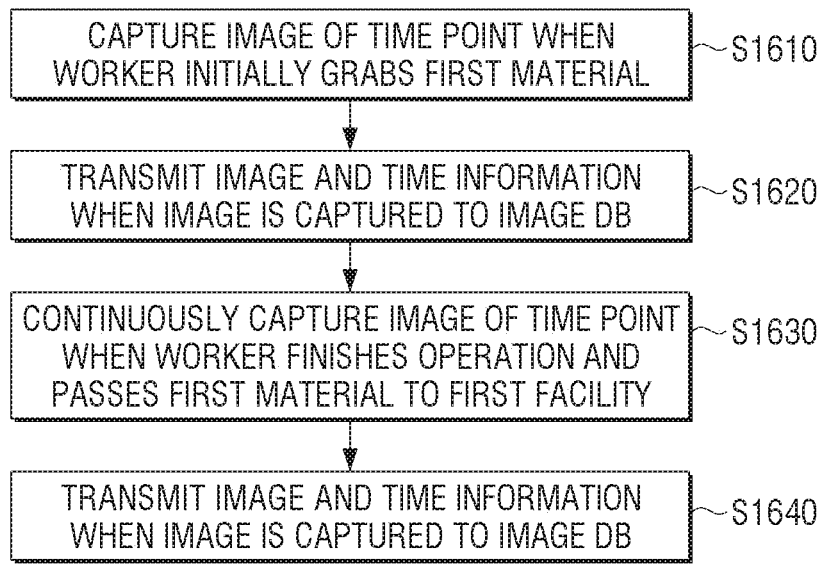

FIG. 16 is a flowchart illustrating an example of a procedure in which a virtual log is generated when a worker handles a material manually.

Referring to FIG. 16, first, the camera may generate the image of the first material which is continuously captured at the time point when a worker grabs the first material in operation S1610.

Then, the camera may transmit the image captured in the operation S1610 and the information on the image capturing time to the image DB 222 in operation S1620.

Then, the camera may generate the image continuously captured at the time when the worker finishes an operation and passes the first material to the next facility, in operation S1630.

Then, the camera may transmit the image captured in operation S1630 and the information on the image capturing time to the image DB 222 in operation S1640.

An example of a procedure for generating virtual log information based on the information on the captured image and the capturing time will be described with reference to FIG. 17.

Figure 17:
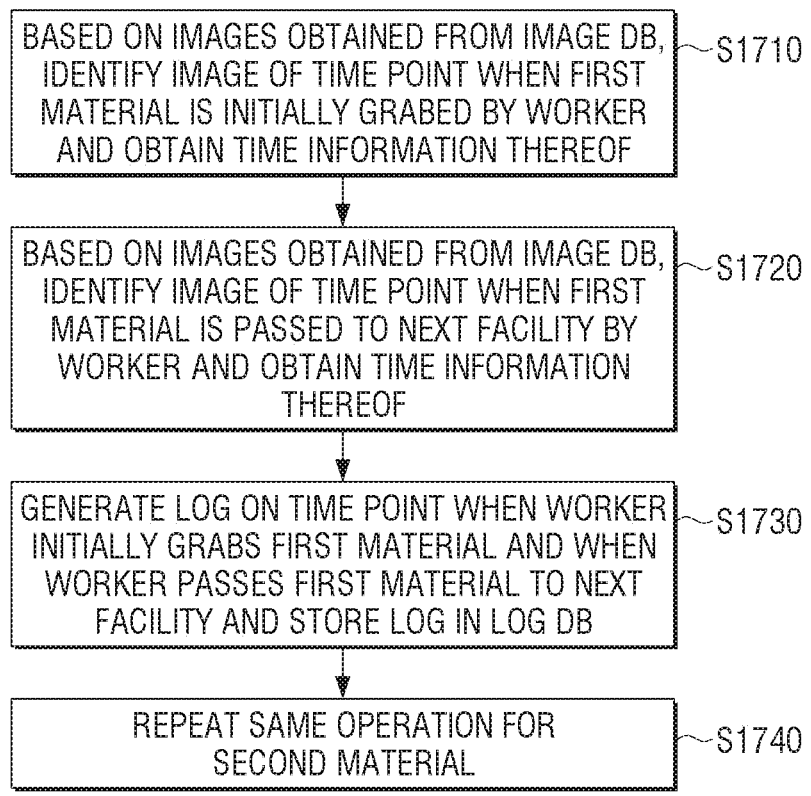

Referring to FIG. 17, the image recognizer/analyzer of the virtual log generation module 103 may obtain the images continuously captured when the worker initially grabs the first material, from the image DB 222, identify the image at the time point when the worker initially grabs the first material by analyzing the obtained images, and obtain the time information of the corresponding image, in operation S1710.

The image recognizer/analyzer of the virtual log generation module 103 may obtain the images continuously captured at the time point when the worker passes the first material to the next facility from the image DB 222, identify the image of the time point when the worker passes the first material to the next facility by analyzing the obtained images, and obtain the time information of the corresponding image, in operation S1720.

The log generator of the virtual log generation module 103 may generate the log information (virtual log information) including the time point when the worker initially grabs the first material and the time point when the worker passes the first material to the next facility, and store the generated log information in the facility log DB 221, in operation S1730.

The same procedure is repeated for the second material following the first material in operation S1740. Accordingly, the virtual log information may be generated for each of all materials handled by the worker.

The information on the operation of the worker may be collected by an operation sensor, in addition to the camera.

After the material is completed as a component, the ID generated for the material can be imprinted as a barcode on the component. Thereafter, the component moves to an assembly operation and assembled with the other components to complete a product. Then, the completed product may be assigned a serial number.

Figure 18:
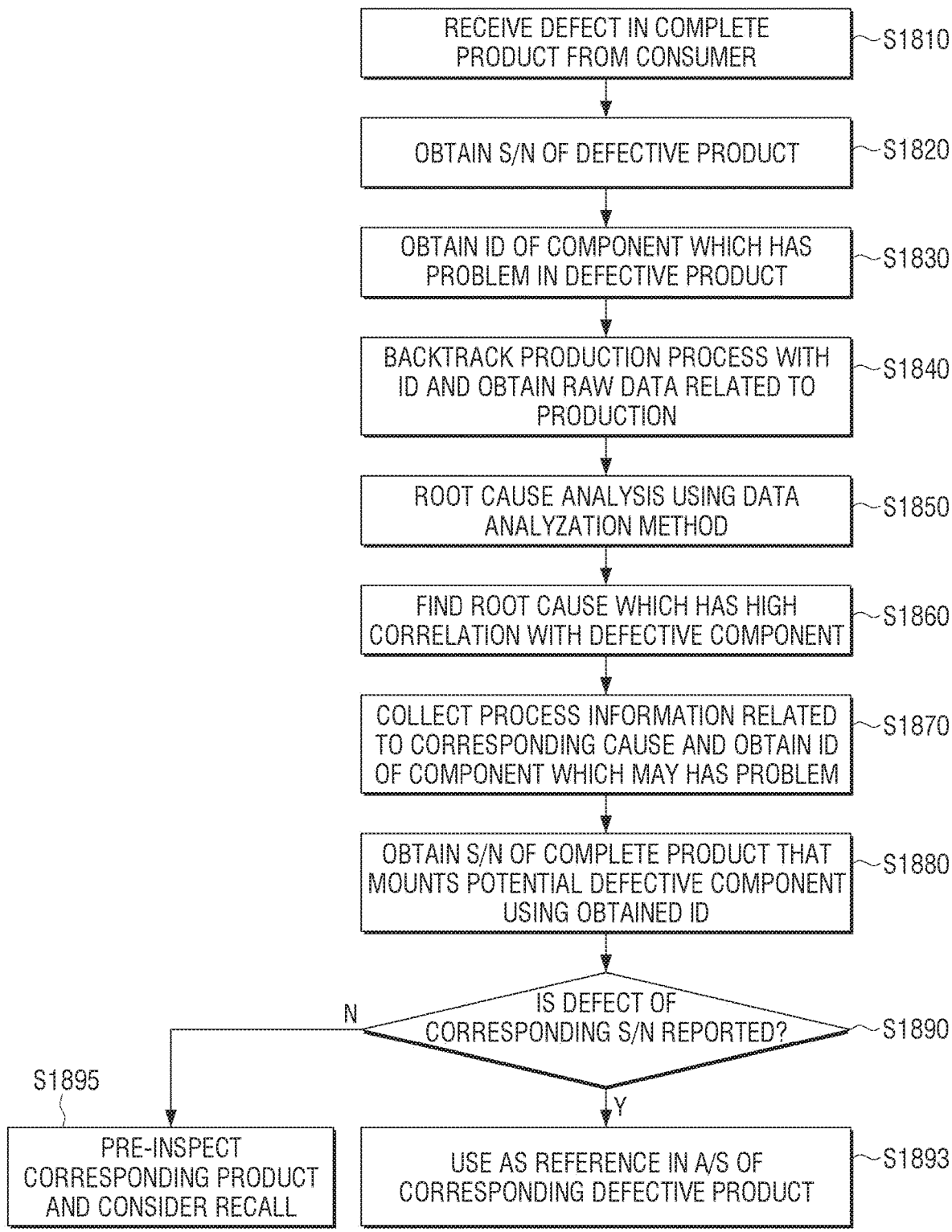
FIG. 18 is a flowchart illustrating an example of a procedure for, when a defective product occurs, identifying a product to be recalled after analyzing data by performing backtracking based on an ID according to an embodiment of the disclosure.

FIG. 18 is a flowchart illustrating an example of a procedure for, when a defective product occurs, identifying a product to be recalled after analyzing data by performing backtracking based on an ID according to an embodiment of the disclosure.

First, if a defective product is reported by a consumer in operation S1810, the serial number of the defective product may be obtained in operation S1820.

The server 100 stores the information in which the serial number of the product and IDs of all components that compose the product are mapped. If the serial number of the defective product and the information on the component that has a problem are input to the server 100, the server 100 may obtain the ID of the component which has a problem in the defective product, in operation S1830. If an ID is imprinted on the component, the imprinted ID itself can be used.

In addition, the server 100 may obtain the tracking information to which the obtained ID is assigned, backtrack the production process based on the obtained tracking information, and obtain raw data related to the production, in operation S1840. The raw data related to the production may include at least one of a process name for each component (time for progressing a process), a facility ID (input/production/output time), the name of a related worker and an operation time, environmental information when processing each process, facility, and operation (sensing temperature/humidity/quality of air, etc.), the status of a facility in the corresponding time identified from the facility ID (spindle motor torque, temperature, pressure, etc.), MSA of an inspector that inspects the corresponding component (analysis information on measurement system), LOT number of raw material of a production, information on a supplier, etc.

In addition, the server 100 may analyze the cause of defect by using a data analysis method in operation S1850. The data analysis method can be, for example, a statistical analysis (distribution/significant difference, etc.), machine learning (classification, clustering, etc.), reinforcement learning, etc.

The server 100 may find the root cause highly correlated to the defective component in operation S1860.

An example of a data analysis method for finding the cause of defect will be described with reference to FIG. 19.

Figure 19:
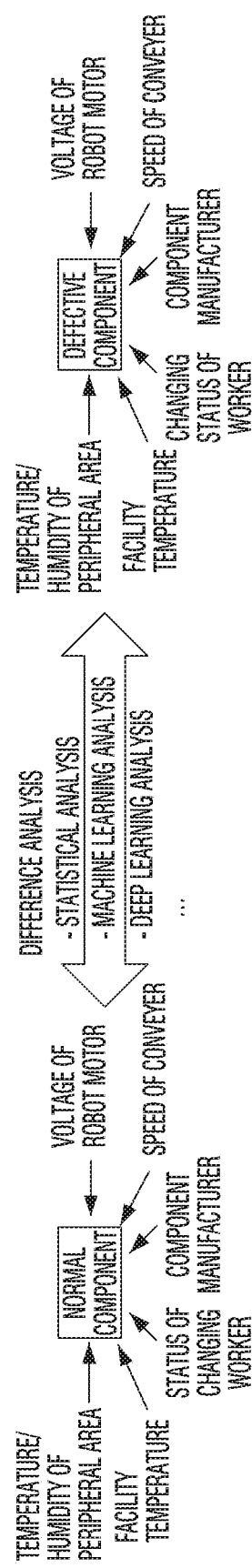
FIG. 19 is a view illustrating an example of a data analysis method to find a cause of a defect according to an embodiment of the disclosure.

FIG. 19 is a view illustrating an example of a data analysis method to find a cause of a defect according to an embodiment of the disclosure.

Referring to FIG. 19, the cause can be analyzed by comparing the process status when a normal component is produced and the process status when a defective component is produced. Here, a statistics analysis, a machine learning, or a deep learning analysis may be used. Specifically, it could be analyzed whether the defect is concentrated in a specific time point, a specific process, or a specific facility, and the difference between the time point, process, and a facility in which the defective component is produced, and the production status in which a normal component is produced could be analyzed. For example, it can be identified that if temperature is higher than 30 degrees and humidity is maintained over 70%, the defect rate increases. The root cause which is highly correlated to the defective component can be found based on the above analyzation. If the root cause is found, an action to resolve the cause can be performed. For example, the automatic temperature and humidity adjustment value can be reset.

The server 100 collects the information on the process related to the corresponding cause and obtain the ID of the components that passes the same process and considered to be defective, in operation S1870.

In addition, the server 100 may obtain the serial number of a complete product on which the potentially defective component is mounted by using the obtained ID in operation S1880. Then, the it may be confirmed whether a defect is reported by a consumer regarding the product having the obtained serial number in operation S1890, and if the defective has been reported, the information on the defective component is informed to an A/S engineer so as to refer to when performing A/S, in operation S1893. If a defect is not reported, a pre-inspecting and recall for the corresponding product are considered, in operation S1895.

Figure 20:
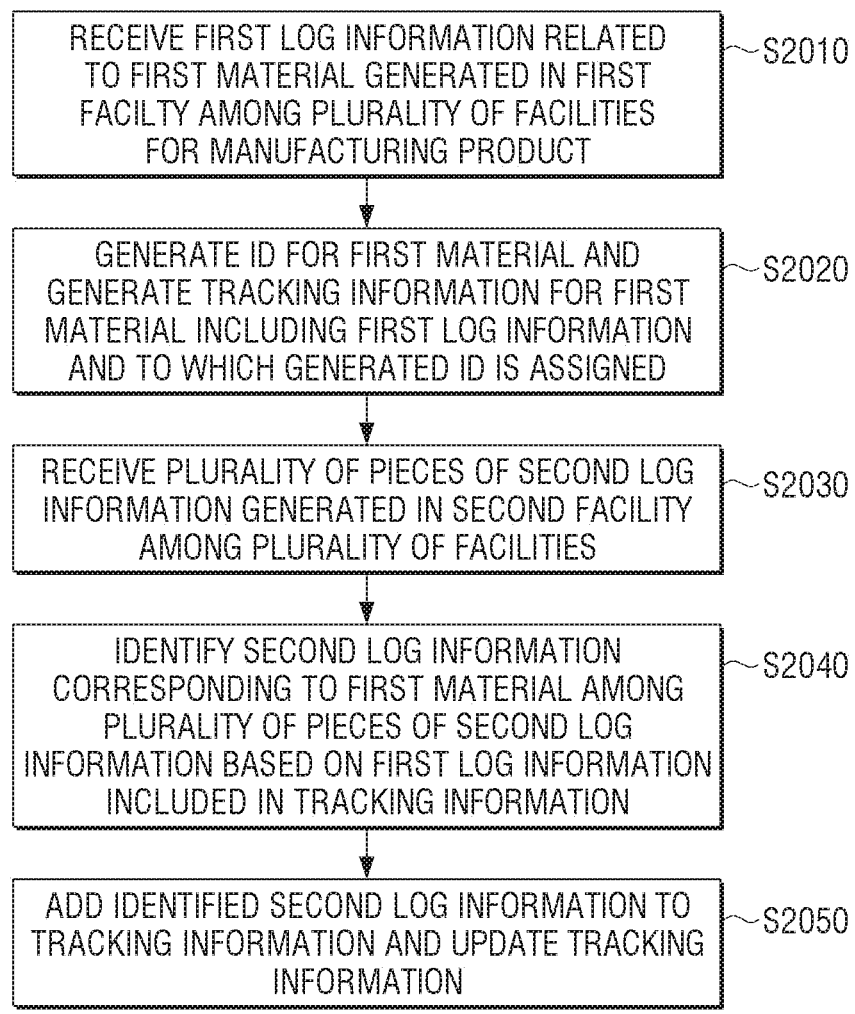
FIG. 20 is a flowchart illustrating a method for controlling a server according to an embodiment of the disclosure.

FIG. 20 is a flowchart illustrating a controlling method of a server according to an embodiment of the disclosure. The flowchart illustrated in FIG. 20 may be composed of operations processed in the server 100 described in the embodiment. Accordingly, the description regarding the server 100 can be applied to the flowchart illustrated in FIG. 20 even if the description is omitted in the followings.

Referring to FIG. 20, first, the server 100 may receive the first log information related to the first material generated in the first facility among a plurality of facilities for manufacturing a product, in operation S2010. Then, the server 100 may generate an ID regarding the first material and generate tracking information regarding the first material to which the generated ID is assigned and which includes the first log information, in operation S2020.

In addition, the server 100 may receive the plurality of pieces of second log information generated in the second facility among the plurality of facilities, in operation S2030. Then, the server 100 may identify the second log information corresponding to the first material among the plurality of pieces of second log information based on the first log information included in the tracking information, in operation S2040.

In this case, the first log information may include the time when the first material is put in and out of the first facility, and each of the plurality of pieces of second log information may include the time when an arbitrary material is put in and out of the second facility.

In this case, the server 100 may identify the second log information including the time when the arbitrary material is input, corresponding to the time when the first material is output, included in the first log information among the plurality of pieces of second log information, in operation S2040.

In addition, the server 100 may add the identified second log information to the tracking information and update the tracking information in operation S2050.

Meanwhile, if the following stage of the first facility of an automation section is the second facility of a non-automation section, the server 100 may receive the image captured through a camera for monitoring the second facility, and generate the virtual log information related to the movement of the first material in the second facility based on the image. In addition, the server 100 may update the tracking information by adding the generated virtual log information to the tracking information regarding the first material generated based on the log information of the first facility.

In this case, the server 100 may identify the first material being put in and out of the second facility based on the image, and generate the virtual log information including the time when the first material is put in the second facility and the time when the first material is put out of the second facility.

The image may include successive frame images and the server 100 may identify the first material from the first frame images corresponding to the time when the first material is put out of the first facility from among the frame images, and identify the first material being put out of the second facility by tracking the first material identified from the frame images following the first frame image.

Meanwhile, if the second facility is a conveyer, the server 100 may calculate the speed of the first material which is put in a conveyer and transferred based on the received image, and identify the first material from among the plurality of arbitrary materials put out of the conveyer in the image based on the calculated speed.

Meanwhile, if the following stage of the first facility of a non-automation section is the second facility of an automation section, the server 100 may receive the plurality of pieces of second log information generated in the second facility, identify the second log information corresponding to the time when the first material is put out of the second facility among the plurality of pieces of second log information based on the virtual log information generated based on the image of the first facility, and update the tracking information by adding the identified second log information to the tracking information on the first material generated based on the virtual log information.

In addition, if the first component is completed based on the first material, the server 100 may store the serial number recorded on the first component in association with an ID. In addition, the server 100 may provide the tracking information to which the ID is assigned, if the serial number is input.

According to the above embodiment, the tracking information that may consistently track the location of the material related to the facility can be generated based on the log information obtained by different facilities that perform related operations, and by using the relation thereof. In addition, if a problem is sensed when analyzing the tracking information, the component (or material) related to the problematic situation can be selected, and thus, the quality control can be improved.

The above described various embodiments can be implemented as a software, a hardware, or a combination thereof. According to the hardware embodiment, embodiments that are described in the embodiments may be implemented by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. Especially, the above described various embodiments can be implemented by the processor 130 of the server 100. In a software embodiment, various embodiments described in the disclosure such as a procedure and a function may be implemented as separate software modules. The software modules may respectively perform one or more functions and operations described in the embodiments.

The above-described various embodiments may be realized as a software including an instruction which may be stored in a machine-readable storage media which may be read by a machine (e.g., a computer). The machine is an apparatus that calls the instructions stored in the storage media and which may operate according to the called instructions, and may include the server 100.

If this instruction is executed by a processor, the processor may perform the function corresponding to the instructions by itself or by using the other elements under control of the processor. The instruction may include code generated or executed by a compiler or an interpreter. For example, as the instruction stored in the storage is executed by a processer, the controlling method of the above described server 100 can be executed. For example, as the instruction stored in the storage is executed by a processor of an apparatus (or an electronic apparatus), the controlling method including receiving first log information related to a first material generated in a first facility among a plurality of facilities for manufacturing a product, generating an ID regarding the first material, generating tracking information on the first material including the first log information, assigning the generated ID to the tracking information, receiving a plurality of pieces of second log information generated in a second facility among the plurality of facilities, identifying second log information corresponding to the first material among the plurality of pieces of second log information based on the first log information included in the tracking information, and updating the tracking information by adding the identified second log information to the tracking information.

A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an embodiment, the method according to the above-described various embodiments may be provided as being included in a computer program product. The computer program product may be traded as a product between a seller and a consumer. The computer program product may be distributed online in the form of machine-readable storage media (e.g., compact disc ROM (CD-ROM)) or through an application store (e.g., Play Store™ and App Store™). In the case of online distribution, at least a portion of the computer program product may be at least temporarily stored or temporarily generated in a server of the manufacturer, a server of the application store, or a storage medium such as memory of a relay server.

According to the various example embodiments, the respective elements (e.g., module or program) of the elements mentioned above may include a single entity or a plurality of entities. According to the various example embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server comprising:
  a communicator;
  a memory configured to store computer executable instructions; and
  a processor configured to execute the computer executable instructions to:
    receive, through the communicator, first log information comprising an input time and an output time of a first material generated in a first facility among a plurality of facilities, the first facility belonging to a first process among a series of processes for manufacturing a product,
    generate an identifier (ID) regarding the first material,
    generate tracking information on the first material comprising the input time and the output time of the first material,
    assign the ID to the tracking information,
    receive, through the communicator, a plurality of pieces of second log information generated in a second facility among the plurality of facilities, the second facility belonging to a second process that follows the first process,
    identify second log information comprising an input time and an output time of the first material among the plurality of pieces of second log information by identifying the input time of the first material in the second log information using the output time of the first material in the first log information included in the tracking information, and
    update the tracking information on the first material to include the identified second log information of the first material.

2. The server as claimed in claim 1, wherein the processor is configured to execute the computer executable instructions to generate the ID regarding the first material based on a time when the first material is put in the first process.

3. The server as claimed in claim 1, wherein the processor is configured to execute the computer executable instructions to:
  receive an image, captured by a camera for monitoring a third facility that belongs to a third process that follows the second process, through the communicator,
  generate image-based log information related to a movement of the first material in the third facility based on the image, and
  secondly update the updated tracking information based on the image-based log information.

4. The server as claimed in claim 3, wherein the processor is configured to execute the computer executable instructions to:
  identify the first material being put in and out of the third facility based on the image, and
  generate the image-based log information including a time when the first material is put in the third facility and a time when the first material is put out of the third facility.

5. The server as claimed in claim 4,
  wherein the image includes successive frame images, and
  wherein the processor is configured to execute the computer executable instructions to:
    identify the first material in a first frame image corresponding to a time when the first material is put out of the second facility among the frame images, and
    identify the first material being put out of the third facility by tracking the identified first material in frame images following the first frame image.

6. The server as claimed in claim 4, wherein the processor, based on the third facility including a conveyer, is configured to execute the computer executable instructions to:
  calculate a speed of the first material which is put in the conveyer and transferred, based on the received image, and
  identify the first material among a plurality of arbitrary materials put out from the conveyer in the image, based on the calculated speed.

7. The server as claimed in claim 4, wherein the processor, based on the third facility including a tray having a plurality of material load spaces, is configured to execute the computer executable instructions to:
  identify a space where the first material is stacked in the tray based on the image, and
  generate the image-based log information by including information on the identified space.

8. The server as claimed in claim 4, wherein the processor is configured to execute the computer executable instructions to:
- receive a plurality of pieces of third log information, generated in a fourth facility that belongs to a fourth process following the third process, through the communicator,
- identify third log information corresponding to a time when the first material is put out of the third facility in the plurality of pieces of third log information based on the image-based log information, and
- thirdly update the secondly updated tracking information based on the identified third log information.

9. The server as claimed in claim 1, wherein the processor, based on a first product being completed based on the first material, is configured to execute the computer executable instructions to store a serial number recorded on the first product in the memory in association with the ID.

10. The server as claimed in claim 9, wherein the processor, based on the serial number being input, is configured to execute the computer executable instructions to provide the tracking information to which the ID is assigned.

11. The server as claimed in claim 10, wherein the processor, based on the serial number being input, is configured to execute the computer executable instructions to:
- obtain information on at least one facility where the first material passes through, based on the tracking information to which the ID is assigned,
- obtain an ID regarding a material different from the first material that passes through the at least one facility, and
- provide the serial number which is stored in association with the obtained ID.

12. A method for controlling a server, the method comprising:
- receiving first log information comprising an input time and an output time of a first material generated in a first facility among a plurality of facilities, the first facility belonging to a first process among a series of processes for manufacturing a product;
- generating an identifier (ID) regarding the first material;
- generating tracking information on the first material comprising the input time and the output time of the first material;
- assigning the ID to the tracking information;
- receiving a plurality of pieces of second log information generated in a second facility among the plurality of facilities, the second facility belonging to a second process that follows the first process;
- identifying second log information comprising an input time and an output time of the first material among the plurality of pieces of second log information by identifying the input time of the first material in the second log information using the output time of the first material in the first log information included in the tracking information; and
- updating the tracking information on the first material to include the identified second log information of the first material.

* * * * *